US011807994B2

(12) United States Patent
Segi

(10) Patent No.: US 11,807,994 B2
(45) Date of Patent: Nov. 7, 2023

(54) SOUND ABSORBING AND INSULATING MEMBER AND METHOD FOR MANUFACTURING THE SAME

(71) Applicant: TOYOTA SHATAI KABUSHIKI KAISHA, Kariya (JP)

(72) Inventor: Makoto Segi, Kariya (JP)

(73) Assignee: TOYOTA SHATAI KABUSHIKI KAISHA, Kariya (JP)

( * ) Notice: Subject to any disclaimer, the term of this patent is extended or adjusted under 35 U.S.C. 154(b) by 470 days.

(21) Appl. No.: 17/265,767

(22) PCT Filed: Aug. 1, 2019

(86) PCT No.: PCT/JP2019/030182
§ 371 (c)(1),
(2) Date: Feb. 3, 2021

(87) PCT Pub. No.: WO2020/066286
PCT Pub. Date: Apr. 2, 2020

(65) Prior Publication Data
US 2021/0292975 A1 Sep. 23, 2021

(30) Foreign Application Priority Data
Sep. 25, 2018 (JP) .................. 2018-179310

(51) Int. Cl.
*D21J 7/00* (2006.01)
*B60R 13/08* (2006.01)
(Continued)

(52) U.S. Cl.
CPC ............ *D21J 7/00* (2013.01); *B60R 13/0861* (2013.01); *D21H 21/20* (2013.01); *D21J 3/10* (2013.01);
(Continued)

(58) Field of Classification Search
CPC ........... D21J 7/00; D21J 3/10; B60R 13/0861; D21H 21/20; G10K 11/162; G10K 11/172
(Continued)

(56) References Cited

U.S. PATENT DOCUMENTS 4,487,793 A 12/1984 Haines, Jr. et al.
2011/0127107 A1 6/2011 Tanase et al.
(Continued)

FOREIGN PATENT DOCUMENTS

JP S52-91513 A 8/1977
JP S59-76352 A 5/1984
(Continued)

OTHER PUBLICATIONS

PCT Notification of Transmittal of Translation of the International Preliminary Report on Patentability (PCT/IB/338), dated Mar. 25, 2021 (1 page); Translation of PCT International Preliminary Report on Patentability (PCT/IPEA/409) (6 pages).

*Primary Examiner* — Mark Halpern
(74) *Attorney, Agent, or Firm* — Christensen, Fonder, Dardi & Herbert PLLC

(57) ABSTRACT

In a first step, a molding die is immersed in a raw liquid including cellulosic fibers. Then, the liquid of a raw liquid is sucked through a net material by a liquid suction part, so as to cause the cellulosic fibers to be laminated on the net material. In the second step, the cellulosic fibers laminated on the net material are dried, so as to form a protrusion. In the third step, the dried protrusion and the communication part are removed from the molding die. A passage part of the communication part is formed at a position where a projection portion had been arranged, the passage part being configured to communicate an inside of the protrusion with an outside of the protrusion.

11 Claims, 11 Drawing Sheets

(51) Int. Cl.
*D21H 21/20* (2006.01)
*D21J 3/10* (2006.01)
*G10K 11/162* (2006.01)
*G10K 11/172* (2006.01)

(52) U.S. Cl.
CPC .......... *G10K 11/162* (2013.01); *G10K 11/172* (2013.01)

(58) Field of Classification Search
USPC .......................................................... 162/218
See application file for complete search history.

(56) References Cited

U.S. PATENT DOCUMENTS

2015/0241838 A1    8/2015  Ishida et al.
2021/0323488 A1*  10/2021  Segi ........................ B32B 9/043

FOREIGN PATENT DOCUMENTS

| | | |
|---|---|---|
| JP | S59-123888 A | 7/1984 |
| JP | H06-158751 A | 6/1994 |
| JP | H06-298014 A | 10/1994 |
| JP | 2009-096342 A | 5/2009 |
| JP | 2010-031136 A | 2/2010 |
| JP | 2011-133855 A | 7/2011 |
| JP | 2017-105374 A | 6/2017 |
| JP | 2017-191321 A | 10/2017 |
| JP | 2018-090678 A | 6/2018 |
| JP | 2018-096018 A | 6/2018 |

* cited by examiner

SOUND ABSORBING AND INSULATING MEMBER AND METHOD FOR MANUFACTURING THE SAME

CROSS-REFERENCE TO RELATED APPLICATIONS

The present application is a U.S. National Phase entry of, and claims priority to, PCT Application No. PCT/JP2019/030182, filed Aug. 1, 2019, which claims priority to Japanese Patent Application No. 2018-179310, filed Sep. 25, 2018, all of which are incorporated herein by reference in their entireties for all purposes.

BACKGROUND

The present disclosure relates to a sound absorbing and insulating member provided with a hollow protrusion and a communication part for communicating between an inside and an outside of the protrusion, and a method for manufacturing the sound absorbing and insulating member.

This type of sound absorbing and insulating member is used for various structures from the viewpoint of noise countermeasure, and is particularly suitably used as a structural member of a vehicle. For example, the vehicle interior member disclosed in Japanese Unexamined Patent Application Publication No. 2009-96342 is a plate-like resin member corresponding to the sound absorbing and insulating member of the present disclosure. This member can be used as an interior material of a vehicle. The vehicle interior member has a surface side base material arranged on the vehicle interior side, and a back side base material arranged on the opposite side as vehicle interior side. A flat plate-like intermediate base material is interposed between the surface side base material and the back side base material. The surface side base material and the back side base material are provided with a plurality of cells forming a resonator structure having almost the same structure. For example, we will explain the surface side base material as an example of the resonator structure. An inside surface of the surface side base material, which faces an intermediate base material, has projected lattice-like ribs. The inside surface is partitioned into a plurality of cells by the ribs. An opening penetrating the surface side base material in the thickness direction is provided on the bottom side of each cell. This opening allows the inside and the outside of the surface side base material to communicate with each other. In Japanese Unexamined Patent Application Publication No. 2009-96342, a vehicle interior material is used as a deck board or a door trim of a vehicle. The vehicle interior material can absorb the sound inside and/or outside the vehicle interior by using the resonance principle of Helmholtz. That is, the sound in the vehicle interior is attenuated and absorbed in the cell after entering the opening of the surface side base material. The sound outside of the vehicle interior is attenuated and absorbed in the cell after entering the opening of the back side base material.

The sound absorbing and insulating member is known to have a difference in sound absorbing performance and sound insulating performance depending on a constituent material. In particular, it is known that a laminated body of cellulosic fibers has excellent sound absorbing performance and sound insulating performance. In Japanese Unexamined Patent Application Publication No. 2015-61955, a molded article is manufactured from a material in which cellulosic fibers are integrated in a laminated state by pulp molding. Therefore, when manufacturing the sound absorbing and insulating member using Japanese Unexamined Patent Application Publication No. 2015-61955, proper rigidity can be imparted to the sound absorbing and insulating member, while also improving the sound absorbing and insulating performance.

SUMMARY OF THE INVENTION

In conventional pulp molding, cellulosic fibers are laminated in a molding die, and then the laminated cellulosic fibers are integrated by being dried. In such a molding method, although the outer shape of the sound absorbing and insulating member is formed, a passage part of the communicating part for communicating the inside and the outside of the sound absorbing and insulating member remains in an unformed state. Therefore, it is necessary to separately form the passage part in the sound absorbing and insulating member after molding. Thus, it is assumed that the number of manufacturing processes of the sound absorbing and insulating member is increased. In the sound absorbing and insulating member, the length dimension of the communicating part and the opening area of the passage part are adjusted according to the sound (frequency) to be absorbed. However, when using the pulp molding, the length dimension of the communicating part can be easily limited by the thickness dimension of the molded article. Since providing a difference in the thickness dimension of different parts of the molded article is not considered in general pulp molding, the sound (frequency) to be absorbed can be limited. Accordingly, there is a need for an improved sound absorbing and insulating member and a method for manufacturing the same.

BRIEF SUMMARY

According to a first aspect of the present disclosure, a manufacturing method of a sound absorbing and insulating member is a method for manufacturing a sound absorption and sound insulation member provided with a hollow protrusion and a communication part for communicating an inside of the protrusion with and an outside of the protrusion. Although the performance of the sound absorbing and insulating member may be improved by using cellulosic fibers as a material of the sound absorbing and insulating member, it is desirable to improve the performance of the sound absorbing and insulating member more appropriately for this kind of constitution.

A molding die for molding the sound absorbing and insulating member of this aspect includes a molding surface having an outer shape corresponding to the protrusion, a net material arranged along the molding surface, and a liquid suction part opened to the molding surface. The molding surface has a recessed portion provided at a position where the communication part is formed. A rod-like or plate-like projection portion projects from a bottom of the recessed portion and passes through the net material. The performance of the sound absorbing and insulating member can be appropriately improved by manufacturing via a first step to a third step, described later. In the first step, the molding die is immersed in a raw liquid including cellulosic fibers. Then, liquid of the raw liquid is sucked through the net material by the liquid suction part so as to cause the cellulosic fibers laminated to be on the net material. In the second step, the cellulosic fibers laminated on the net material are dried so as to form the protrusion. The cellulosic fibers laminated on the recessed portion are dried so as to form an outer shape of the communication part. Then, the dried protrusion and communication part are removed from the molding die. A passage part of the communication part formed at a position where the projection portion had been arranged, so that the passage part may communicate the inside of the protrusion with the outside of the protrusion. In this aspect, the protrusion may be formed via the first step to the third step. At the same time, the communication part may be formed by the recessed portion and the projection portion. The recessed portion and the projection portion allows the communication part to be constituted set independently from the configurations of the protrusion formed by the other molding surfaces.

According to a second aspect of the present disclosure, in the manufacturing method of the sound absorbing and insulating member, an opening ratio of the passage part may be defined by an external dimension of the projection portion and/or the number of the projection portions. In this aspect, the opening ratio of the passage part may be defined by the projection portion. In case of a single passage part, the opening ratio refers to its opening area. In case of a plurality of the passage parts, the opening ratio refers to total of their opening areas. Thus, the communication part may be certainly formed according to a sound to be absorbed.

According to a third aspect of the present disclosure, in the manufacturing method of the sound absorbing and insulating member according to the first aspect or the second aspect, a length dimension of the communication part is generally defined by a depth dimension of the recessed portion. In this aspect, the length dimension of the communication part is generally defined by the recessed portion. Thus, the communication part may be accurately formed according to the sound to be absorbed.

According to a fourth aspect of the present disclosure, in the manufacturing method of the sound absorbing and insulating member according to any one of the first aspect to the third aspect, the protrusion and the communication part may be integrally formed during the second step. In this aspect, the protrusion and the communication part are integrally formed so that the manufacturing process can be simplified and that the number of components can be reduced, as compared with a case where the protrusion and the communication part are separately manufactured.

According to a fifth aspect of the present disclosure, in the manufacturing method of the sound absorbing and insulating member according to any one of the first aspect to the fourth aspect, the projection portion projects from an opening of the recessed portion. In this aspect, the projection portion projects from the recessed portion so that a tip of the projection portion can be prevented from being buried in the cellulosic fibers during the formation process of the communication part.

According to a sixth aspect of the present disclosure, in the manufacturing method of the sound absorbing and insulating member according to any one of the first aspect to the fifth aspect, the raw liquid includes an additive for improving water resistance of the sound absorbing and insulating member and/or an additive for improving strength of the sound absorbing and insulating member. In this aspect, water resistance and/or strength of the sound absorbing and insulating member can be improved by the additive, thereby contributing to performance improvements.

According to a seventh aspect of the present disclosure, a sound absorbing and insulating member comprises a hollow protrusion and a communication part communicating an inside of the protrusion with an outside of the protrusion. The protrusion is formed of a material where cellulosic fibers are integrated in a laminated state. The protrusion integrally has a general part where the cellulosic fibers are laminated to a predetermined thickness and a thick part where a larger amount of the cellulosic fibers are laminated as compared to the general part. An outer shape of the communication part is formed by the thick part. The communication part is provided with a passage part extending through the thick part in the thickness direction. The communication part is configured to communicate the inside of the protrusion with the outside of the protrusion through the passage part. In this aspect, the protrusion is formed of a material where cellulosic fibers are integrated in a laminated state. Thus, the sound absorbing and insulating performance of the sound absorbing and insulating member can be improved. Additionally, instead of the general part, the thick part is used to form the communication part and the passage part. Thus, the communication part and the passage part may be designed independently from the configuration of the protrusion formed by the general part.

DETAILED DESCRIPTION

Figure 1:
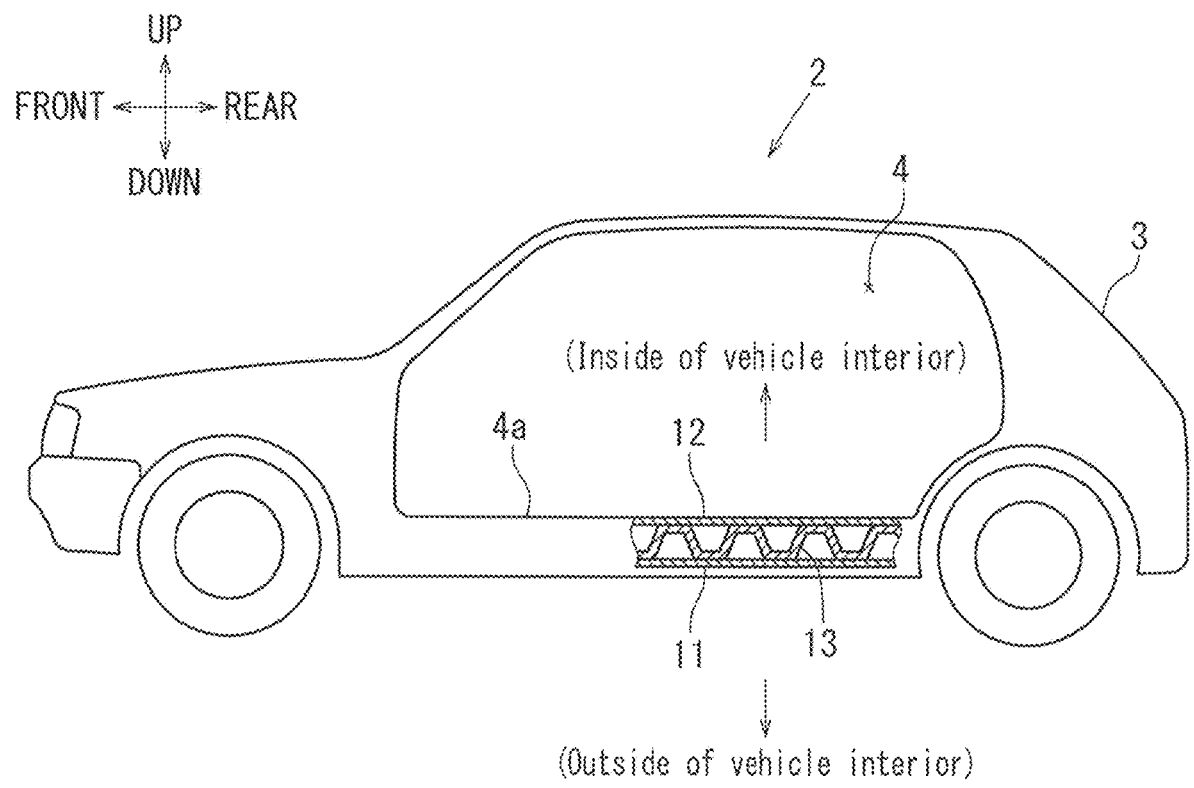
FIG. 1 is a schematic perspective side view of a vehicle.
Figure 2:
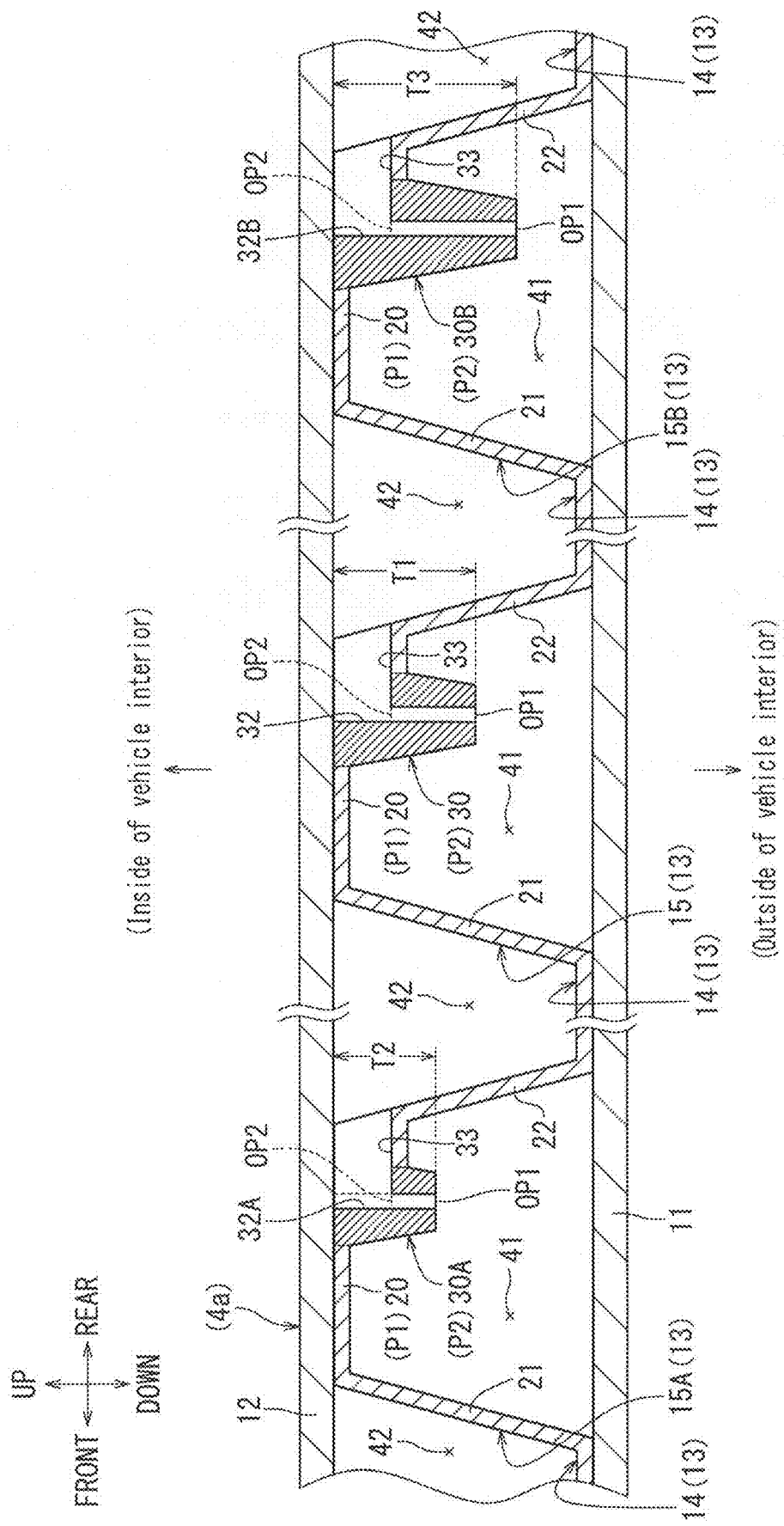
FIG. 2 is an enlarged schematic perspective side view showing a part of the vehicle.
Figure 3:
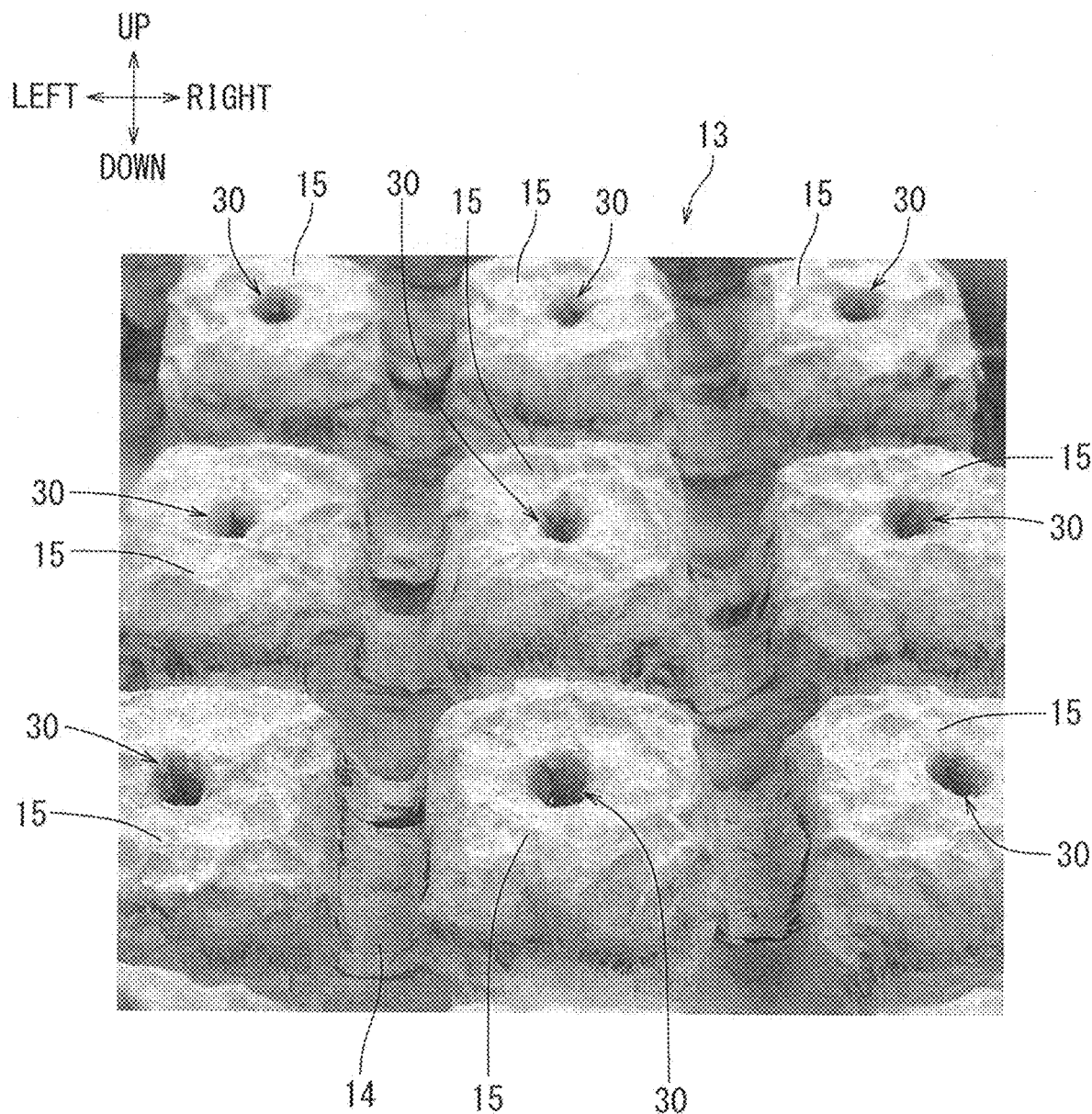
FIG. 3 is a perspective view of a sound absorbing and insulating member.
Figure 4:
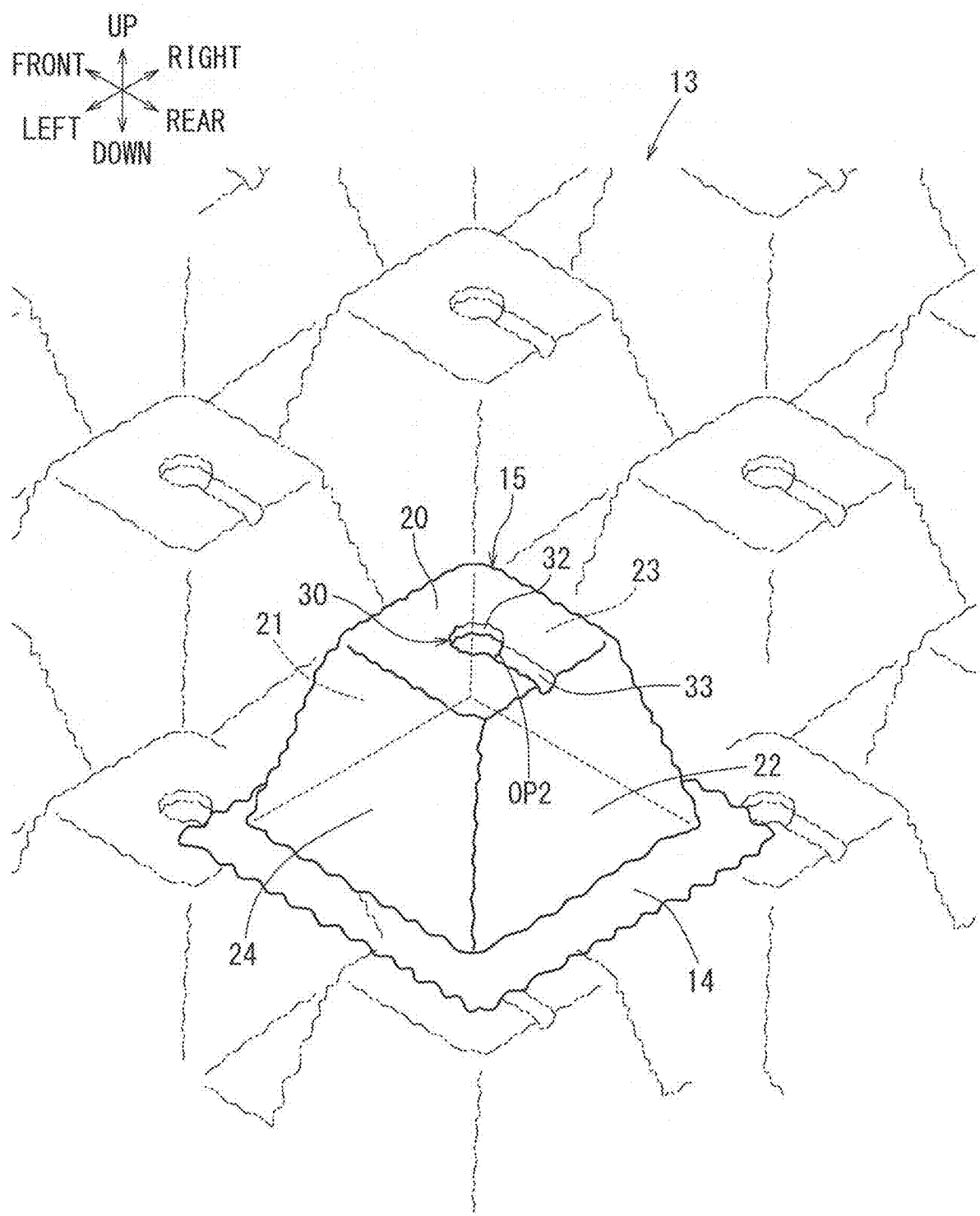
FIG. 4 is an enlarged perspective view of the sound absorbing and insulating member.
Figure 5:
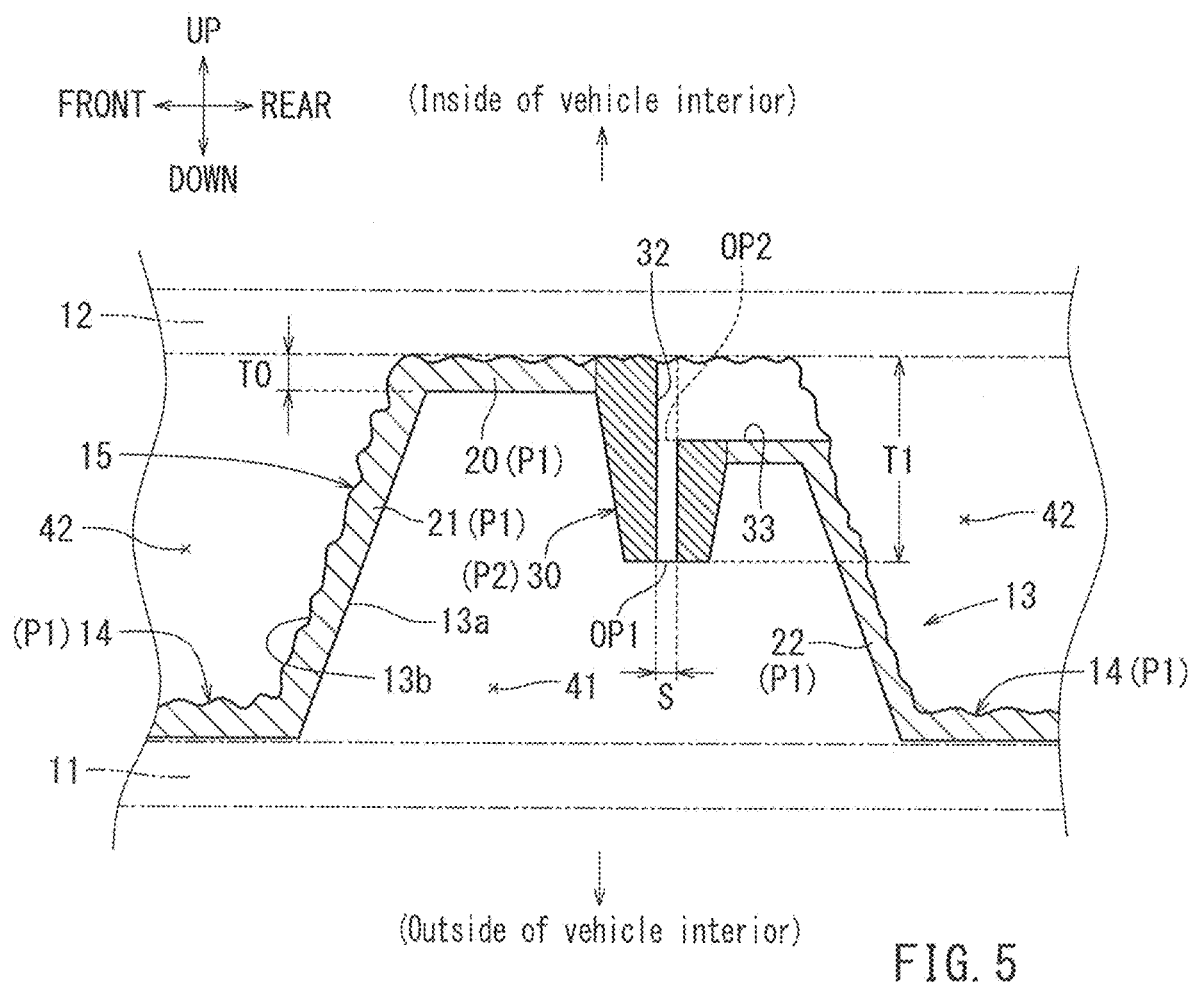
FIG. 5 is a schematic sectional-view of a protrusion.
Figure 10:
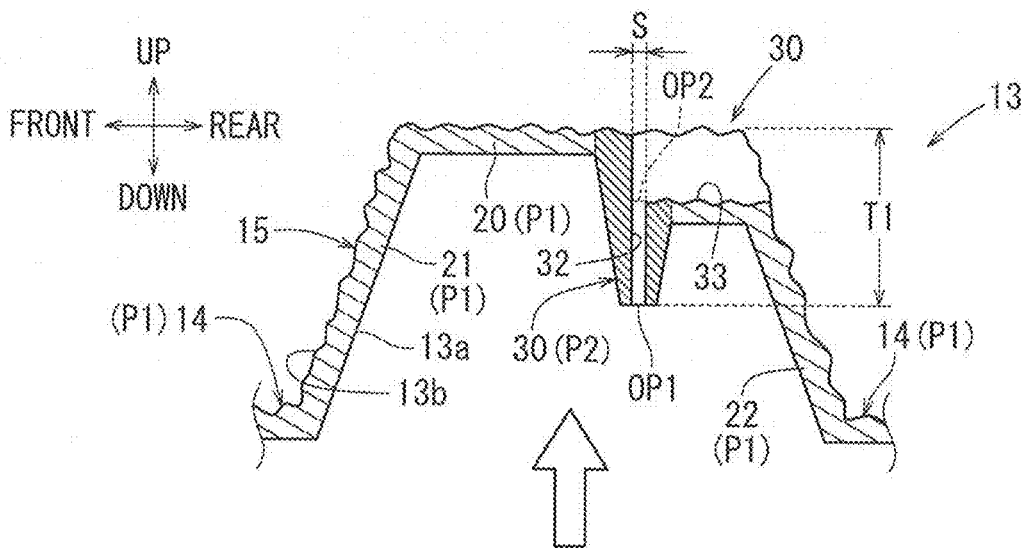
FIG. 10 is a schematic cross-sectional view of the molding die in a third step.
Figure 10:
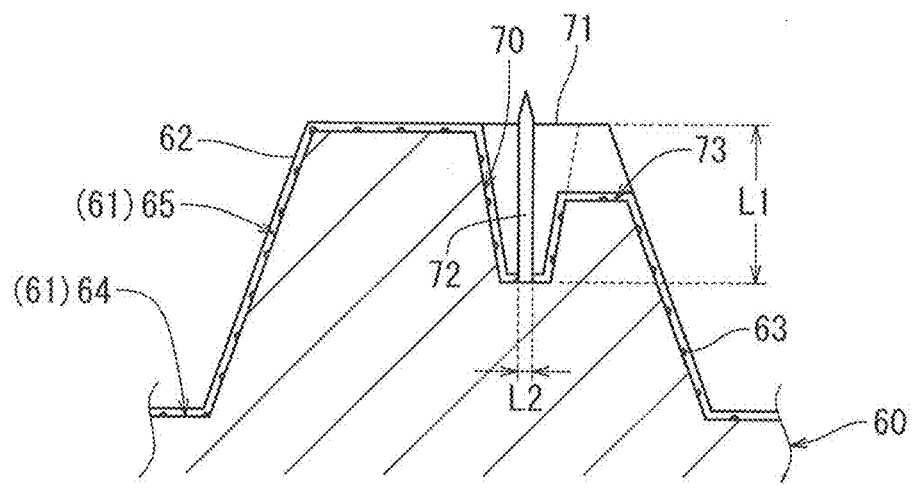
Figure 11:
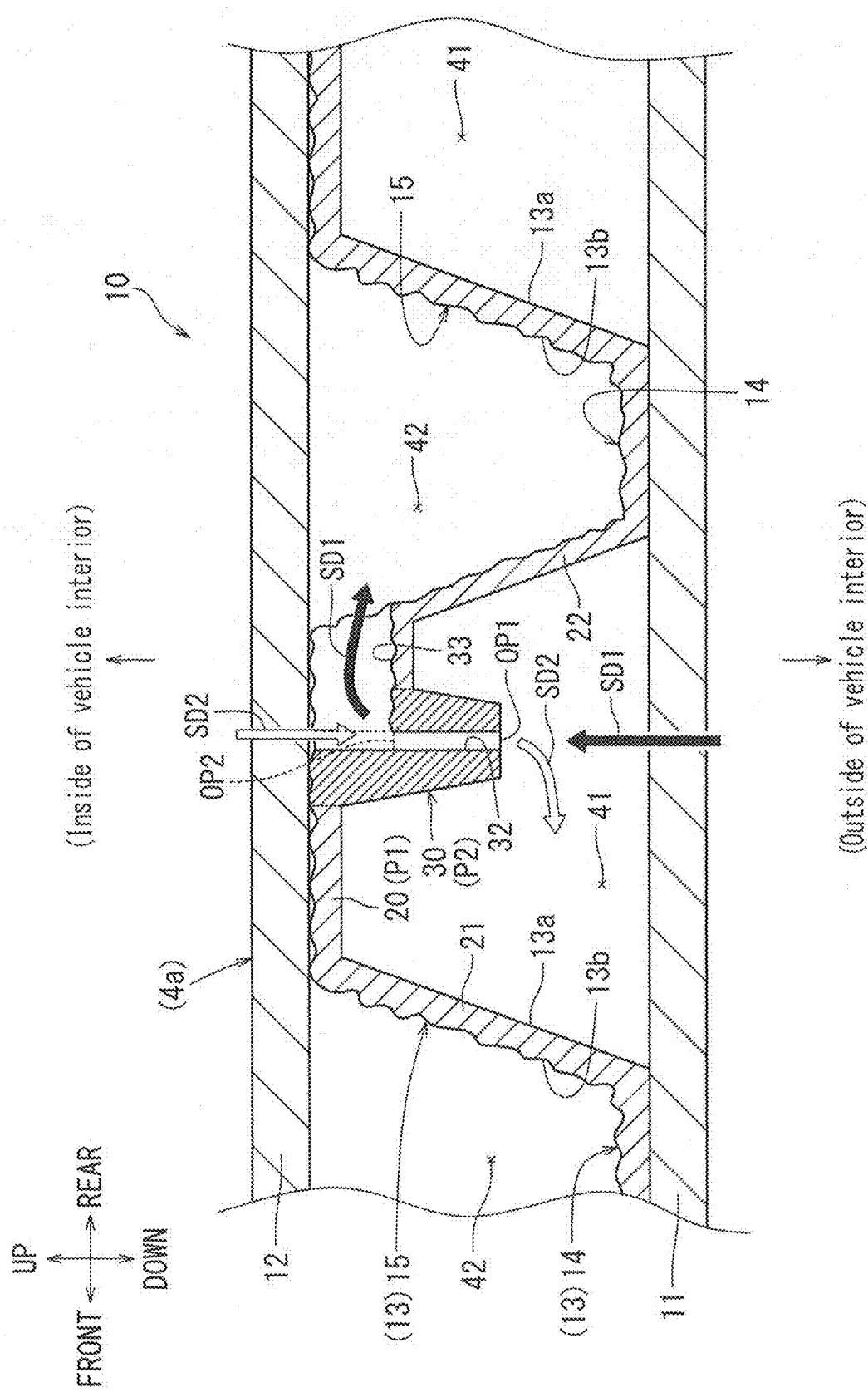
FIG. 11 is a schematic perspective side view of the vehicle showing a sound movement route.

An embodiment for carrying out the present disclosure will be described below with reference to FIGS. 1 to 16. In FIGS. 1, 2 and 11, arrows showing a longitudinal direction and a vertical direction of a vehicle are appropriately shown for convenience. In FIGS. 3 to 5, arrows indicating a longitudinal direction, a lateral direction and a vertical direction of the sound absorbing and insulating member are shown as a reference in a state where the sound absorbing and insulating member is attached to the vehicle. In FIGS. 7 to 10, arrows showing a longitudinal direction and a vertical direction of a molding die are appropriately illustrated in accordance with the direction of the sound absorbing and insulating member.

A vehicle 2 shown in FIG. 1, has a vehicle body 3 forming an outer shape, a vehicle interior 4 surrounded by the vehicle body 3, and a sound absorbing and insulating member 13 (described later) installed on a floor surface 4a side of the vehicle interior 4. The sound absorbing and insulating member 13 is arranged between a first partition member 11 and a second partition member 12, as shown in FIG. 2. The sound absorbing and insulating member 13 can absorb sound inside and outside the vehicle interior. The partition members 11, 12 and the sound absorbing and insulating member 13 form first spaces 41 and second spaces 42, so that sound emitted from the inside and the outside of the vehicle interior can be absorbed by using the resonance principle of Helmholtz. In this embodiment, the sound absorbing and insulating member 13 is made of cellulosic fibers to improve its performance. This kind of constitution is desired to more appropriately improve the performance of the sound absorbing and insulating member 13. In this embodiment, the performance of the sound absorbing and insulating member 13 made of the cellulosic fibers can be more appropriately improved by the manufacturing method and constitution, described later. The constitution and the manufacturing method of the sound absorbing and insulating member 13 are described in detail below.

[First Partition Member and Second Partition Member]

The first partition member 11 shown in FIG. 2 is a plate-like or planar member disposed outside the vehicle interior. The second partition member 12 is a plate-like or planar member disposed inside the vehicle interior. Various materials allowing for passage of sound can be used as the material of each of the partition members 11, 12. These kinds of materials may include a surface material, such as cloth, leather and felt, various kinds of resin and rubber plate materials, metal plate materials made of the same or different kinds materials as that of the vehicle body, and the same kind of materials as the sound absorbing and insulating member 13, described later. It is desirable to use a relatively flexible material to form the second partition member 12. For example, a surface material or a resin plate material, which can be used as a carpet, can be adopted as the flexible material. A gap where the sound absorbing and insulating member 13 can be disposed is formed between the first partition member 11 and the second partition member 12. Both of the partition members 11, 12 are arranged substantially parallel to each other in the longitudinal direction. The partition members 11, 12 are arranged at an arrangement place of the sound absorbing and insulating member 13.

[Sound Absorbing and Insulating Member]

The sound absorbing and insulating member 13 shown in FIGS. 2 to 4 is a plate-like member having a predetermined area. The sound absorbing and insulating member 13 is arranged in a state of being sandwiched between the first partition member 11 and the second partition member 12. The sound absorbing and insulating member 13 is bent so as to be alternately brought into contact with the first partition member 11 and the second partition member 12. The sound absorbing and insulating member 13 may have bottom walls 14, a plurality of protrusions 15, 15A, 15B, and a plurality of communication parts 30, 30A, 30B (described later). These parts may include general parts P1 and thick parts P2. The bottom wall 14 is a plate-like member forming a lower surface of the sound absorbing and insulating member 13. The bottom wall 14 is brought into surface contact with an upper surface of the first partition member 11. As shown in FIG. 3, when the sound absorbing and insulating member 13 is viewed from above, the sound absorbing and insulating member 13 is provided with a plurality of the protrusions 15, etc. in longitudinal and lateral rows. The bottom wall 14 is provided so as to fill the space between the protrusions 15.

[Protrusion]

Each protrusion (a plurality of protrusions 15, second protrusions 15A, and third protrusions 15B) shown in FIG. 2 protrudes upward from the bottom wall 14, so as to fill the gap between the first partition member 11 and the second partition member 12. The protrusions 15, 15A, 15B have substantially the same basic constitution, except for a difference in length of the corresponding communicating parts 30, 30A, 30B. Thus, the details of the protrusions are described below utilizing only one protrusion 15 as an example. The protrusion 15 shown in FIGS. 4 and 5 may be a hollow cylindrical part forming a quadrangular pyramid shape. The protrusion 15 may have a ceiling wall 20 forming an upper surface, four side walls 21-24 forming peripheral surfaces, and a communication part 30. The ceiling wall 20 is a rectangular plate-like member as seen from above. The ceiling wall 20 is in surface contact with the lower surface of the second partition member 12, in a state of being applied thereto. In the protrusion 15, the bottom wall 14 is not arranged below the ceiling wall 20. Thus, the protrusion 15 may have an open part. The protrusion 15 is closed by the first partition member 11.

The four side walls (a front side wall 21, a rear side wall 22, a right side wall 23, a left side wall 24) shown in FIG. 4 connect the corresponding sides of the ceiling wall 20 to the bottom wall 14. The four side walls are arranged between the first partition member 11 and the second partition member 12. In the protrusion 15, opposing side walls are arranged so as to form a hat cross-sectional shape. In this way, the structural strength of the protrusion can be enhanced. In other words, the front side wall 21 forming the front face and the rear side wall 22 forming the rear face of the protrusion 15 may be inclined so as to gradually separate from each other in a direction from the ceiling wall 20 to the bottom wall 14, as shown in FIG. 5. The right side wall 23 forming the right face and the left side wall 24 forming the left face of the protrusion 15 may also be inclined in a direction so as to gradually separate from each other in a direction from the ceiling wall 20 to the bottom wall 14, as shown in FIG. 4. In this way, the protrusion 15 may be formed to have a hat cross-sectional shape, so as to have enhanced strength. Thus, even when a load is applied from the vertical direction to the protrusion 15 through the second partition member 12 shown in FIG. 2, the shape of the protrusion 15 can be maintained. Therefore, the sound absorbing and insulating member 13 can be used as a reinforcing member and/or a raising member, etc. for a vehicle and has good usability.

[General Part]

The sound absorbing and insulating member 13 shown in FIGS. 2 and 5 may integrally have a general part P1 where the cellulosic fibers are laminated to have a predetermined thickness and a thick part P2 (in each figure, for convenience, the thick part is finely hatched so as to be distinguished from the general part). The general part P1 is a portion where the cellulosic fibers are laminated at a predetermined average thickness dimension TO, with reference to FIG. 5. The general part P1 forms the side walls 21-24, the bottom wall 14, and the ceiling wall 20, except for the thick part P2. The average thickness dimension TO of the general part P1 is not particularly limited as long as the proper rigidity of the sound absorbing and insulating member 13 can be secured. For example, when the sound absorbing and insulating member 13 is used as an interior material for a vehicle, the average thickness dimension TO of the general part P1 can be generally set in a range of 1.5 mm to 15 mm. It is desirable to set the average thickness dimension T0 in a range of 2.0 mm to 8.0 mm in consideration of securing light weight.

[Thick Part]

The thick part P2 as shown in FIG. 5 is provided at a part of the ceiling wall 20 of the protrusion 15. The thick part P2 may be formed by laminating a larger amount of the cellulosic fibers, compared to the general part P1. For example, in this embodiment, the thick part P2 is generally cylindrical and is provided generally at a center of the ceiling wall 20 of the protrusion 15. The thick part P2 may project downward from a lower surface of the ceiling wall 20. The average thickness dimension T1 of the thick part P2 defines a length dimension of the communication part 30, described later. The average thickness dimension T1 can be set independently of the general part P1. That is, the average thickness dimension T1 of the thick part P2 can be appropriately set according to the performance of the communication part 30. The average thickness dimension T1 may depart from the range of the average thickness T0 of the general part P1.

[Communication Part]

Each communication part 30 as shown in FIGS. 2-5 is configured to communicate the inside with the outside of the corresponding protrusion 15. Each communication part 30 is also configured to connect the first space 41 with the second space 42. Since each of the protrusions 15 is provided with a communication part 30 having almost the same constitution, one protrusion 15 will be described in detail as an example of the communication part 30. The communication part 30 of the protrusion 15 shown in FIGS. 4 and 5 may be provided at the ceiling wall 20 and may have a passage part 32 communicating the inside with the outside of the protrusion 15. The outer shape of the communication part 30 may be formed of the thick part P2, which is relatively thick. The length dimension of the communication part 30 can be defined by the length dimension T1 of the thick part P2.

[Passage Part]

The passage part 32 as shown in FIG. 5 may have an opening area S allowing for the passage of gas. The passage part 32 may penetrate the thick part P2 in a thickness direction (e.g., vertical direction in FIG. 5). The passage part 32 may have a first opening OP1 and a second opening OP2. The first opening OP1 may open in the protrusion 15 at a lower end of the thick part P2 forming the communication part 30. The second opening OP2 may open at an upper side of the thick part P2. In this embodiment, as shown in FIG. 5, the second opening OP2 is connected to the second space 42 through a groove part 33 formed in the ceiling wall 20. The groove part 33 is a linear recessed portion linearly extending from an upper end (e.g., at the second opening OP2) of the communication part 30 toward the rear side wall 22. A rear end of the groove part 33 opens toward an upper end side of the rear side wall 22. In the communication part 30, according to the resonance principle of Helmholtz, a frequency of the sound to be absorbed can be set by adjusting an opening ratio of the passage part 32. The thick part P2 may be provided with a single or a plurality of communication parts 30 (and/or passage parts 32). When a single communication part 30 is formed, the opening ratio can be defined by a ratio of the opening area S of the passage part 32 to an area of the ceiling wall 20. When a plurality of communication parts 30 are formed, the opening ratio can be defined by a ratio of the total opening area of all the passage parts 32 to the area of the ceiling wall 20.

[Material and Manufacturing Method of the Sound Absorbing Member]

The sound absorbing and insulating member 13 shown in FIGS. 2-5 may be formed from the cellulosic fibers, as described above. More specifically, the sound absorbing and insulating member 13 may be formed from cellulosic fibers integrated in a laminated state. Various cellulosic fibers, such as plant fibers (natural fibers), regenerated fibers, refined fibers, and semi-synthetic fibers, can be used as the cellulosic fibers. Considering the convenience of raw material procurement and recyclability, cellulosic fibers obtained from pulp (described later) can be suitably used. The material obtained by integrating the cellulosic fibers in a laminated state is light in weight, compared with a metal or a resin, and has excellent sound absorbing and sound insulating performance. For example, the surface of the sound absorbing and insulating member 13 has a moderate hardness, since the cellulosic fibers are densely interlaced and integrated. Additionally, the sound inside and outside the vehicle interior can be appropriately insulated by the surface. When a sound absorbing and insulating member 13 is manufactured, it is desirable to improve the performance of the sound absorbing and insulating member 13 more appropriately, for example, by forming a proper communicating part 30 in the protrusion 15, especially one with a relatively simple constitution. In this embodiment, the sound absorbing and insulating member 13 may be manufactured through a first process to a third process, described later. In this way, the performance of the sound absorbing and insulating member 13 can be improved more appropriately.

[Molding Die]

Figure 7:
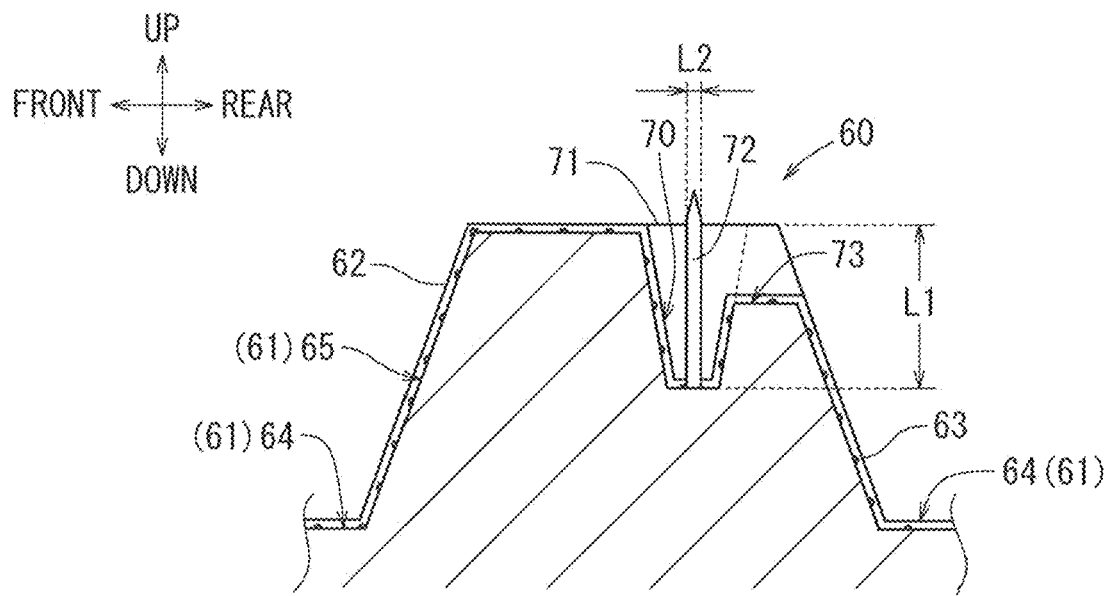
FIG. 7 is a schematic cross-sectional view of a molding die.

A molding die 60 as shown in FIG. 7 may be used for molding the sound absorbing and insulating member. The molding die 60 may have a molding surface 61 forming its outer surface, a net material 62 arranged along the molding surface 61, and a liquid suction part 63 opened to the molding surface 61. In FIG. 7, the dots show positions where the opening of the liquid suction part 63 can be arranged. The reference character 63 indicating the liquid suction part is attached to a single dot. The molding surface 61 is provided with a plurality of convex portions 65 (described later) arranged at an appropriate interval. The convex portions 65 may be used to form the protrusions. A flat part 64, which may be used for forming the bottom wall, is provided between adjacent convex portions 65 (in FIG. 7, only one convex portion is illustrated for convenience). The net material 62 is a net-like member allowing for passage of the liquid, while not substantially allowing passage of the cellulosic fiber. The net material 62 is disposed so as to cover almost the whole surface of the molding surface 61. The liquid suction part 63 is configured to suck liquid into the molding die 60, as described later. The liquid suction parts 63 may have a plurality of openings provided at appropriate positions of the molding surface 61. The liquid suction part 63 may have a pump (not shown) and a flow passage (not shown) in the molding die 60, which may be used for transferring the sucked liquid to a predetermined place.

[Convex Portion (Recessed Portion, Projection Part) of the Molding Surface]

The molding surface 61 shown in FIG. 7 is provided with a plurality of convex portions 65 having substantially the same configuration. Thus, the details of only one convex portion 65 will be described below. With reference to FIGS. 7 and 10, the convex portion 65 may have a quadrangular pyramid shape, essentially having a shape following the protrusion 15. An upper surface for forming the ceiling wall 20 of the protrusion 15 is provided with a recessed portion 70, a projection portion 72, and a groove recessed portion 73. The recessed portion 70 corresponds to a recessed portion of the present disclosure, and is provided at a position where the communication part 30 is to be formed. The recessed portion 70 is formed by a partially recessed upper surface of the protrusion 15. In this embodiment, the recessed portion 70 generally has a cylindrical shape long in the vertical direction. The dimension in the vertical direction of the recessed portion 70 is a depth dimension L1. The average thickness dimension (which may correspond to the length dimension of the communication part) T1 of the thick part P2 can be defined by the depth dimension L1 of the recessed portion 70.

With reference to FIGS. 7 and 10, the projection portion 72 has a rod-like shape and may be used to form the passage part 32 of the communication part 30. The projection portion 72 protrudes through the net material 62 and projects from a lower surface forming the bottom of the recessed portion 70. The projection portion 72 is disposed generally at the center of the recessed portion 70. A tip portion of the projection portion 72 is positioned higher than an opening 71 provided at an upper end of the recessed portion 70. The tip portion of the projection portion 72 has a conical shape and a diameter gradually reduced toward the tip. Thus, the cellulosic fibers are hardly laminated on the tip in a first process, described later. A part of the projection portion 72, a part except for the tip, has a predetermined diameter dimension (external dimension) L2, and extends in the vertical direction. The opening area S (opening ratio) of the passage part 32 can be defined by the diameter dimension L2. The groove recessed portion 73 may be used for forming the groove part of the ceiling wall. The depth dimension of the groove recessed portion 73 may be smaller than that of the recessed portion 70 to make the bottom shallow. The groove recessed portion 73 is linearly formed in the upper surface of the convex portion 65. One end side of the groove recessed portion 73 is connected to the upper end of the recessed portion 70.

[The First Step]

In the first step shown in FIG. 8, the molding die 60 is immersed in a raw liquid 80 (described later) containing cellulosic fibers. Then, the liquid of the raw liquid 80 is sucked through the net material 62 by the liquid suction part 63. This allows for the cellulosic fibers to be laminated on the net material 62. For example, after the molding surface 61 is immersed in the raw liquid 80, for instance in a state where the molding die 60 is set upside down, the liquid of the raw liquid 80 is sucked through the liquid suction part 63 opened in the molding surface 61 (see FIG. 7). Since the cellulosic fibers contained in the raw liquid cannot pass through the net material 62, the cellulosic fibers are gradually laminated on the net material 62. In the first step, the liquid is sucked until a desired amount of the cellulosic fibers are laminated on the net material 62, for instance the thickness shown in FIG. 9. In this way, the cellulosic fibers forming the general part P1 of the protrusion 15 may be laminated on the net material 62 covering the convex portion 65. Additionally, the cellulosic fibers are laminated on the groove recessed portion 73 by substantially the same lamination amount as that of the general part P1. Thus, a part of the cellulosic fibers are laminated in a recessed shape so as to form the groove. The cellulosic fibers are also laminated on the recessed portion 70. The recessed portion 70 is formed in a recessed shape having a depth. This causes the cellulosic fiber to be easily accumulated and hardly dropped. As a result, a relatively large amount of the cellulosic fibers are laminated on the recessed portion 70 so as to form the thick part P2. These cellulosic fibers are laminated around the projection portion 72. Since the projection portion 72 projects beyond the opening 71 of the recessed portion 70, even when large amount of cellulosic fibers are laminated on the recessed portion 70, the projection portion 72 may be prevented as much as possible from being buried by the cellulosic fibers.

[Raw Liquid]

Figure 8:
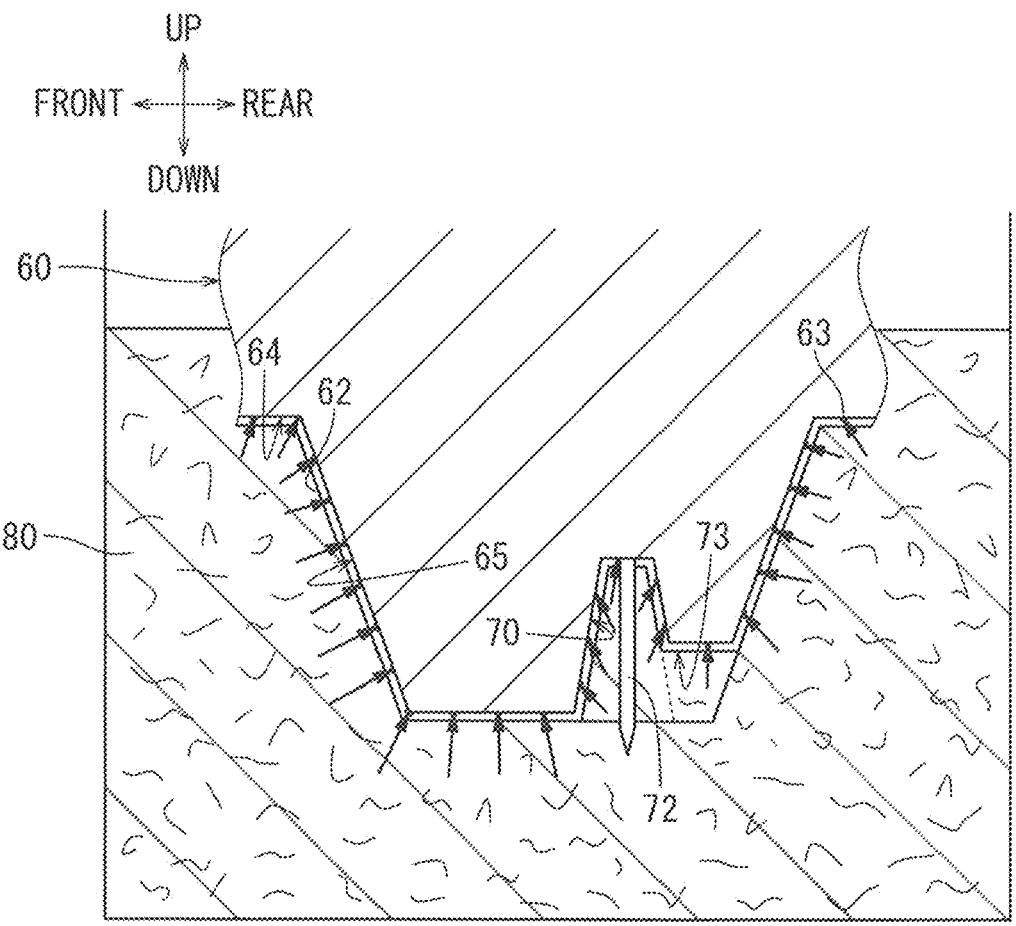
FIG. 8 is a schematic cross-sectional view of the molding die in a first step.

The method for preparing the raw liquid 80 shown in FIG. 8 is not particularly limited. However, as a general preparation method, after a predetermined amount (for example, an amount including a solid content of 0.5 wt. % or more) of the pulp is put into water, the pulp may be stirred until it enters a slurry state. The pulp may include one or any combination of chemical pulp, mechanical pulp, waste paper pulp, and/or non-wood pulp. It is desirable to use waste paper pulp, at least from a viewpoint of recycling or the like. For example, waste paper pulp may include a defibrated waste paper pulp, a defibrated and deinked waste paper pulp, and a defibrated, deinked and bleached waste paper pulp. The raw materials of the waste paper pulp may be obtained from selected waste papers or a non-sorted waste papers, such as high-quality papers, medium quality papers, lower quality papers, newspapers, leaflets, and/or magazines. For example, a chemical pulp may include softwood unbleached kraft pulp (NUKP), hardwood unbleached kraft pulp (LUKP), softwood bleached kraft pulp (NBKP), hardwood bleached kraft pulp (LBKP), softwood semi-bleached kraft pulp (NSBKP), hardwood semi-bleached kraft pulp (LSBKP), softwood sulfite pulp, and hardwood sulfite pulp. For example, a mechanical pulp may include stone ground pulp (SGP), pressurized stone ground pulp (PGW), refiner ground pulp (RGP), thermo-ground pulp (TGP), chemical ground pulp (CGP), and thermo-mechanical pulp (TMP). For example, a non-wood pulp may include pulp made from non-woody fibers, such as kenaf, hemp, and reed.

[Additives]

It is desirable that the raw liquid 80 shown in FIG. 8 includes an additive that contributes to the improvement of the performance of the sound absorbing and insulating member. For example, the additive may include a sizing agent, a paper strengthening agent such as a dry paper strengthening agent and/or a wet paper strengthening agent, a pH adjuster, a freeness improver, a defoaming agent, a bulking agent, a retention aid, an antibacterial agent, an antifungal agent, a filler, and a dye. In particular, the raw liquid 80 preferably includes at least one of a sizing agent contributing to an improvement of water resistance by preventing infiltration of water, a dry paper strengthening agent contributing to an improvement of breaking strength in a dry state, and a wet paper strengthening agent contributing to an improvement of strength in a wet state. Examples of the sizing agent include, a rosin-based sizing agent, an AKD-based sizing agent, an alkenyl succinic anhydride (ASA)-based sizing agent, a petroleum-based sizing agent, and a neutral rosin sizing. Examples of the dry paper strengthening agent include a polyacrylamide-based polymer such as an anionic polyacrylamide resin, a polyvinyl alcohol polymer, a cationic starch, modified starches, urea-formalin resin, and melamine-formalin resin. Examples of the wet paper strengthening agent include a polyamide polyamine epichlorohydrin resin (or a modified product thereof). The amount of each additive added relative to the raw liquid 80 is not particularly limited, as long as the desired performance can be imparted to the sound absorbing and insulating member 13. For example, the sizing agent may be added in a range of 0.5-5 wt. %, and it is desirable to add it in a range of 1.0 wt. % or more. The dry paper strengthening agent may be added in a range of 0.5-5 wt. %, and it is desirable to add it in a range of 3.0 wt. % or more. The wet paper strengthening agent may be added in a range of 2-15 wt. %, and it is desirable to add it in a range of 4.0 wt. % or more.

[The Second Step]

Figure 9:
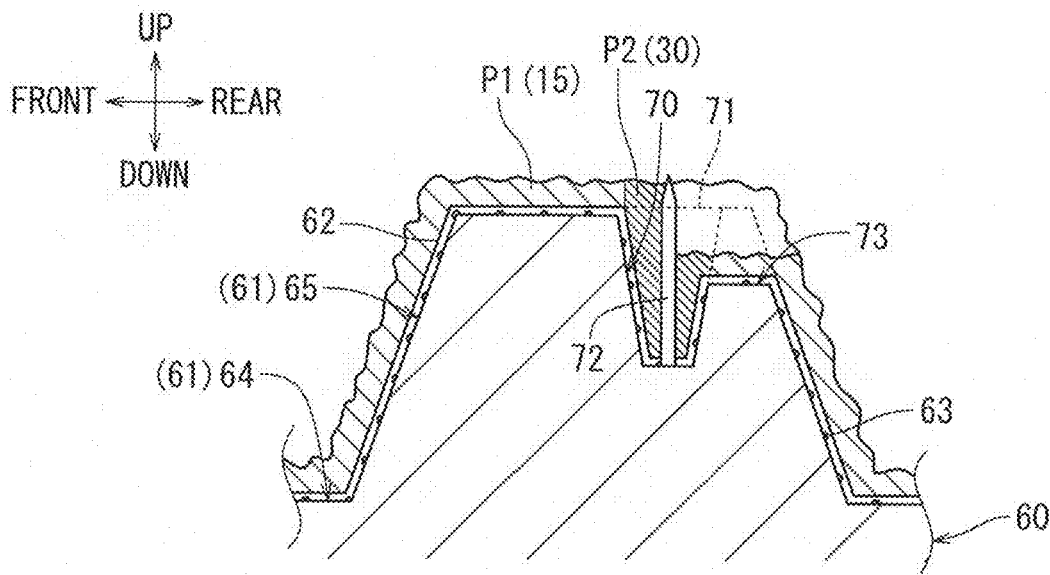
FIG. 9 is a schematic cross-sectional view of the molding die in a second step.

In the second step shown in FIG. 9, the cellulosic fibers laminated on the net material 62 are dried so as to form the protrusion 15. Further, the cellulosic fibers laminated on the recessed portion 70 are dried so as to form the outer shape of the communication part 30. Examples of drying methods may include thermal dry by hot air, hot press or the like, further suction removal of the moisture, and vacuum drying. The heating temperature is not particularly limited. However, the temperature may be preferably in the range of 150-300 degrees C., and more preferably 170-230 degrees C. The drying temperatures may be set from the viewpoint of preventing the burning of the cellulosic fiber and improving the drying efficiency. Thus, the cellulosic fibers may be dried so as to have a predetermined water content by drying during the second process. As a result, the protrusion 15 forming the sound absorbing and insulating member 13, the communicating part 30, and the bottom wall 14 can be formed, as shown in FIG. 10. In this way, the cellulosic fibers forming the general part P1 of the protrusion 15 and the cellulosic fibers forming the thick part P2 are integrated by drying. Thus, the protrusion 15 and the communicating part 30 can be integrally formed. That is, in the ceiling wall 20, the general part P1 forming the protrusion 15 and the thick part P2 forming the outer shape of the communication part 30 are integrally formed without gap. In the second step, the sound absorbing and insulating member 13 may be dried to such a degree as to be removable from the net material 62, and may be further dried after the second step.

[The Third Step]

In the third process shown in FIG. 10, the dried protrusion 15 and the communicating part 30 are removed from the molding die 60. In this way, the inside and the outside of the protrusion 15 communicate with each other via the passage part 32 of the communication part 30 formed by the projection portion 72. That is, in the third step, the protrusion 15 (general part P1) and the bottom wall 14 formed of the cellulosic fibers can be formed by removing the laminated cellulosic fibers from the molding surface 61. At the same time, the outer shape of the communication part 30, which is formed as the thick part P2, is formed by removing the cellulosic fibers from the recessed portion 70. The projection portion 72 fixed to the recessed portion 70 is removed from the communication part 30. In this way, the passage part 32 is formed. The groove part 33 is formed at the ceiling wall 20 by the groove recessed portion 73. The upper side of the passage part 32 (second opening OP2) is configured to communicate with the upper end side of the rear side wall 22 through the groove part 33.

Thus, in this embodiment, the protrusion 15 shown in FIG. 10 can be formed through the first process to the third process. At the same time, the communication part 30 can be formed by the recessed portion 70 and the projection portion 72. The configuration of the communication part 30 can be determined independently of the constitution of the protrusion 15 (in particular, the average thickness dimension T0 of the general part P1), which are formed on the other molding surfaces 61 by providing the recessed portion 70 and the projection portion 72 at a formation location of the communication part 30. That is, the length dimension (T1) of the communication part 30 can generally be defined by the depth dimension L1 of the recessed portion 70 where the thick part P2 is to be formed. Since the length dimension (T1) of the communication part 30 can be determined independent of the general part P1, the length dimension (T1) of the communication part 30 can be freely determined. The opening area S of the passage part 32 of the communication part 30 can be defined by the diameter dimension L2 of the projection portion 72. Therefore, the opening area S can be freely determined by selecting the diameter dimension of the projection portion 72.

[Inner Surface and Outer Surface of the Sound Absorbing and Insulating Member]

According to each of the above-mentioned processes, the inner surface 13a of the sound absorbing and insulating member 13 arranged on the net material 62 side is formed in a relatively smooth state, in part because the inner surface 13a is formed in contact with the net material 62. Unlike this, the outer surface 13b of the sound absorbing and insulating member 13 has a larger surface roughness compared to the inner surface 13a, in part because the cellulosic fibers may be unevenly laminated. Thus, the outer surface 13b is excellent in the diffusion performance of the reflected sound, as compared with the inner surface 13a on the opposite side. Accordingly, it is possible to avoid as much as possible a situation in which the sound (for example, reverberation sounds) is repeated in a specific direction and in which the sound is amplified. When the sound absorbing and insulating member 13 shown in FIG. 5 is installed, it is desirable that the outer surface 13b is directed toward the second partition member 12 side (vehicle interior side), and the inner surface 13a is directed toward the first partition member 11 side, so that the quietness in the vehicle interior can be improved.

[Example of Using the Sound Absorbing and Insulating Member]

In the vehicle 2 shown in FIG. 1, the sound absorbing and insulating member 13 is provided on the floor surface 4a side of the vehicle interior 4 for absorbing and insulating the sound emitted from the outside and from the inside of the vehicle interior (that is, from different sound sources). That is, the sound absorbing and insulating member 13 is arranged between the first partition member 11 and the second partition member 12 in the vehicle 2. These members form the sound absorbing and insulating structure on the floor surface 4a side of the vehicle interior 4. The sound absorbing and insulating member 13 is formed in a bent shape, so as to be alternately brought into contact with each partition member 11, 12, as shown in FIG. 2. In this way, the sound absorbing and insulating member 13 has a plurality of protrusions 15, 15A, 15B. As a result, a plurality of first spaces 41 and a plurality of second spaces 42 are formed between the partition members 11, 12. The first and the second spaces 41, 42 communicate with each other through respective communication parts 30, 30A, 30B. In the sound absorbing and insulating structure of this embodiment, each of the spaces 41, 42 and the communication parts 30, 30A, 30B are configured to absorb sound inside and outside the vehicle interior, at least in part by utilizing the Helmholtz Resonance Principle, described later.

[Helmholtz Resonance Principle]

Figure 6:
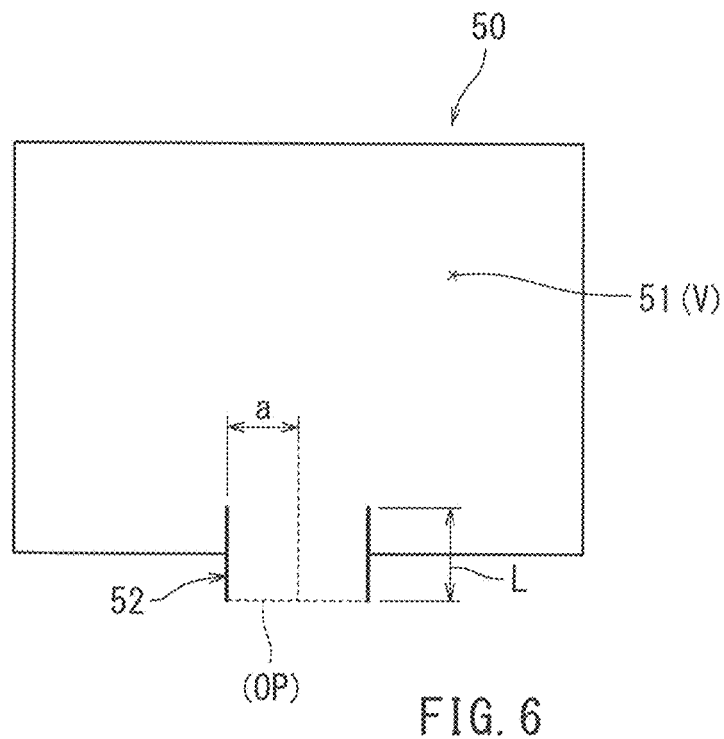
FIG. 6 is a schematic view of a Helmholtz resonator.

We describes the Helmholtz Resonance Principle on the basis of the Helmholtz resonator 50 shown in FIG. 6. The Helmholtz resonator 50 can define a frequency of sound to be absorbed by the configuration of an internal space 51 and a communication part 52 of the resonator. In this Helmholtz resonator 50, V (cm$^3$) is defined as the internal volume of the internal space 51, L (cm) is defined as the length of the communication part 52, a (cm²) is defined as the radius of the opening OP of the communication part 52, and c (cm/s) is defined as the speed of sound. The frequency f (Hz) of the sound incident on the communication part 52 can be obtained according to the following equation (1). The Helmholtz resonator 50 can absorb sound having the same frequency f. The frequency f is inversely proportional to the square root of the volume V of the internal space 51 and the length L of the communication part 52. The frequency f is directly proportional to the square root of the opening area $\pi a^2$ (opening ratio) of the communication part 52.

$$f=(c/2\pi)\times\sqrt{(\pi a^2/(V(L\times 0.6a)))} \qquad \text{Formula 1:}$$

[First Space, Second Space]

The first space 41 and the second space 42 shown in FIG. 2 are configured to attenuate and absorb sound incident to the communication part 30 or the like by utilizing the Helmholtz Resonance Principle. The basic constitution of each of the spaces 41, 42 shown in FIG. 2 is substantially the same for each of the protrusions 15, 15A, 15B. Thus, the details of the space parts 41, 42 for only one example of the protrusion 15 is presented. The first space 41 shown in FIG. 11 is a space in a protrusion 15 closed by the first partition member 11. The first spaces 41 are formed along the lengthwise and crosswise directions of the sound absorbing and insulating members 13, similar to the protrusions 15. The second space 42 is provided between adjacent protrusions 15 and is closed by the second partition member 12. The first space 41 and the second space 42 communicates with each other through the communication part 30 provided in each protrusion 15. That is, in this embodiment, the inside and the outside of the protrusion 15 are connected via the passage part 32 of the communication part 30. In this way, the first opening OP1 of the passage part 32 opens to the first space 41 within the protrusion 15. The second opening OP2 of the passage part 32 is connected to the second space 42 located at the rear side wall 22 side via the groove part 33 of the ceiling wall 20. In this way, the passage part 32 is connected to the second space 42 through the groove part 33. As a result, the passage part 32 can be prevented from being closed due to interference by the partition members 11, 12 (peripheral parts). Further, deformation of the shape of the communication part 30 can be prevented at the time of transportation, and the passage part 32 can be prevented from being closed.

The volume of the first space 41 and the second space 42, for example as shown in FIG. 11, can be appropriately set according to a frequency of the sound to be muffled. For example, in this embodiment, the longitudinal interval dimension (longitudinal length of the bottom wall 14) between the protrusions 15 is set to be smaller than the longitudinal dimension of each protrusion 15. This allows the volume of the first space 41 to be larger than that of the second space 42. According to the Helmholtz Resonance Principle, when the communication part 30 is shared, a relatively low frequency sound can be attenuated in the first space 41 having a larger volume, and a relatively high frequency sound can be attenuated in the second space 42 having a smaller volume.

[Length Dimension of the Communication Part]

According to the Helmholtz Resonance Principle described above, a frequency f (Hz) of the incident sound gradually gets lower as the communication part 52 of the resonator shown in FIG. 6 is lengthened. Therefore, in the sound absorbing and insulating member 13 shown in FIG. 5, the communication part 30 may be lengthened so as to efficiently absorb low frequency sounds. Alternatively, the communication part 30 may be shortened so as to efficiently absorb high frequency sounds. In this embodiment, the communication part 30 is formed in the thick part P2 of the ceiling wall 20. Thus, the length dimension (T1) of the communication part 30 can be made longer, independent of the general part P1 of the ceiling wall 20. Therefore, in this embodiment, the length dimension (T1) of the communication part (30) can be relatively freely changed depending on the sound to be absorbed. This is preferred especially when low frequency sounds are to be absorbed.

The sound absorbing and insulating member 13 shown in FIG. 2 is provided with the protrusion 15, the second protrusion 15A, and the third protrusion 15B, as described above. The second protrusion 15A has a second communication part 30A and a second passage part 32A. The third protrusion 15B has a third communication part 30B and a third passage part 32B. A length dimension (T2) of the second communicating part 30A is smaller than that of the communication part 30 of the protrusion 15. Thus, relatively higher frequency sounds can be absorbed by the second protrusion 15A. A length dimension (T3) of the third communicating part 30B is larger than that of the communication part 30 of the protrusion 15. Thus, relatively lower frequency sounds can be absorbed by the third protrusion 15B. In this way, each length of the communicating parts 30, 30A, 30B of each protrusions 15, 15A, 15B may be different from each other so that a wider frequency range of sounds can be absorbed by the sound absorbing and insulating member 13.

[Insulation and Absorption of Sound Emitted from the Outside of the Vehicle Interior (Vehicle Outside Sound)]

The sound absorbing and insulating structure (11, 12, 13) shown in FIG. 2 is provided with the above-described constitution, so that sound emitted from different sound sources can be efficiently absorbed and insulated. For example, referring to FIG. 11, a vehicle outside sound SD1 emitted from the outside of the vehicle interior is absorbed and insulated by the sound absorbing and insulating structure. The vehicle outside sound SD1 is insulated by the first partition member 11 and the protrusion 15 (each wall), when moving toward the vehicle interior side (upper side in the figure). Then, the vehicle outside sound SD1 incident on the communication part 30 is absorbed in the second space 42. At this time, the vehicle outside sound SD1 enters into the passage part 32 from the first opening OP1 in the first space 41. The vehicle outside sound SD1 then enters into the second space 42 via the second opening OP2. In this embodiment, the second opening OP2 is not closed by the partition members 11, 12. Thus, the vehicle outside sound SD1 can be efficiently absorbed by the second space 42. The second space 42 has a smaller volume. Thus, the second space 42 can efficiently absorb a relatively high frequency sound, such as road noise having a frequency in a high frequency region to an intermediate frequency region.

[Insulation and Absorption of Sound Emitted from the Vehicle Interior (Vehicle Interior Sound)]

Referring to FIG. 11, the sound absorbing and insulating structure (11, 12, 13) can absorb and insulate a vehicle interior sound SD2 emitted from the inside of the vehicle interior. The vehicle interior sound SD2 is insulated by the second partition member 12 and the protrusion 15 (each wall) when moving toward the outside of the vehicle interior (toward the lower side in FIG. 11). Further, the vehicle interior sound SD2 enters the communication part 30 and is absorbed in the first space 41. At this time, the vehicle interior sound SD2 enters into the passage part 32 from the second opening OP2, and then enters into the first space 41 via the first opening OP1. Also in this case, the second opening OP2 is not closed by either of the partition members 11, 12. Thus, the vehicle interior sound SD2 can be efficiently absorbed by the first space 41. The first space 41 has larger volume. Thus, the first space 41 can efficiently absorb sound having a relatively low frequency. In the vehicle interior 4, a reflection sound of the vehicle outside sound SD1 is included in addition to the vehicle interior sound SD2. Therefore, the sound absorbing and insulating member 13 of the present embodiment is arranged in a state where the outer surface 13b, which has an uneven shape, is directed toward the inside of the vehicle interior of the vehicle 2. The outer surface 13b has a large uneven shape and is excellent in sound diffusion performance. The sound absorbing and insulating structure may be used to insulate the vehicle interior sound SD2 and the reflected sound, while avoiding the amplification of reverberation sounds or the like as much as possible. In this way, the sound absorbing and insulating structure may be used for improving the quietness of the vehicle interior 4.

As described above, in the present embodiment, the protrusion 15 and the like can be formed via the first process to the third process. The protrusion 15 can be formed while the communication part 30 and the like is being formed by the recessed portion 70 and the projection portion 72. The recessed portion 70 and the projection portion 72 are provided at a place where the communication part 30 or the like is formed. Thus, the configuration of the communication part 30 or the like can be freely set, independent of the constitution of the protrusion 15 or the like formed by the other molding surface 61 part. The opening ratio of the passage part 32 or the like can be defined by the projection portion 72. The opening ratio corresponds to an opening area S of the passage part 32 if there is a single passage part 32. The opening ratio corresponds to a total opening area S of the passage parts 32 if there are a plurality of the passage parts 32. Thus, it is possible to form the communication part 30 or the like to match the sounds to be absorbed. In this embodiment, the length dimension of the communication part 30 or the like can be defined by the recessed portion 70. Thus, it is possible to form the communication part 30 or the like to match the sounds to be absorbed. In this embodiment, the protrusion 15 or the like and the communicating part 30 or the like are integrated. This allows for simplification of the manufacturing process of the sound absorbing and insulating member 13 and reduction of the number of parts, as compared with the case of separately forming the protrusion 15 or the like and the communicating part 30 or the like. In this embodiment, the projection portion 72 projects beyond the recessed portion 70. Thus, the tip of the projection portion 72 is prevented from being buried in the cellulosic fibers during the formation process of the communication part 30 or the like. In this embodiment, the water resistance and the strength of the sound absorbing and insulating member 13 can be improved by additive(s). This allows for improving the performance of the sound absorbing and insulating member 13. The protrusion 15 or the like may be formed from a material that allows for the cellulosic fibers to be integrated in a laminated state. This allows for further improving the sound absorbing and insulating performance of the sound absorbing and insulating member 13. The communication part 30 or the like and the passage part 32 or the like are formed in the thick part P2, rather than the general part P1. Thus, the configuration of the communication part 30 and the like and the passage part 32 can be set independently of the constitution of the protrusion 15 or the like formed by the general part P1. This relatively simple constitution allows for more appropriately improving the performance of the sound absorbing and insulating member 13 formed of the cellulosic fibers.

TEST EXAMPLES

Figure 12:
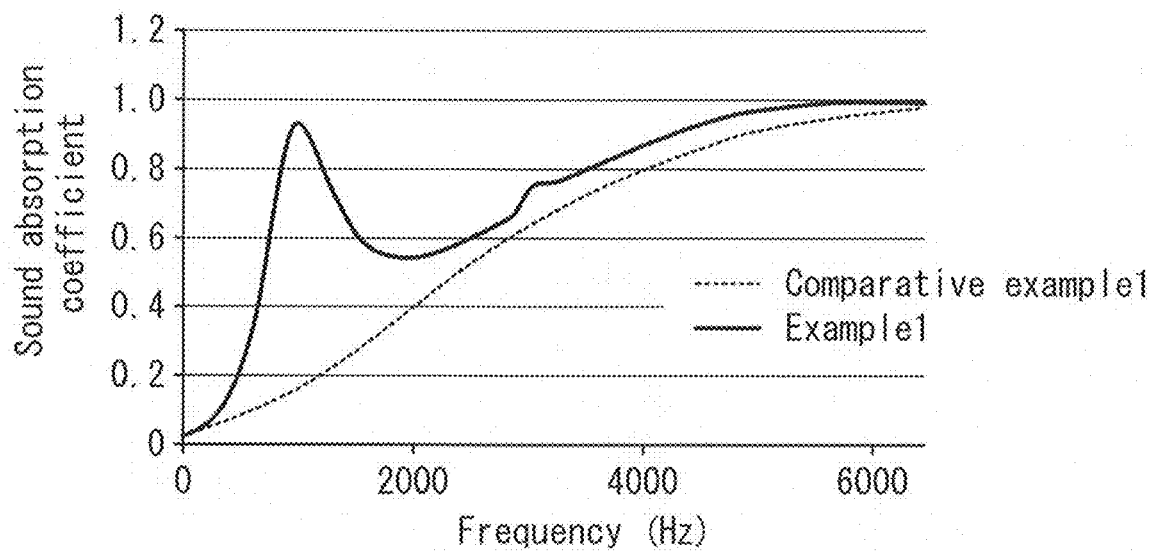
FIG. 12 is a graph showing a relationship between a sound absorption coefficient and a frequency.
Figure 13:
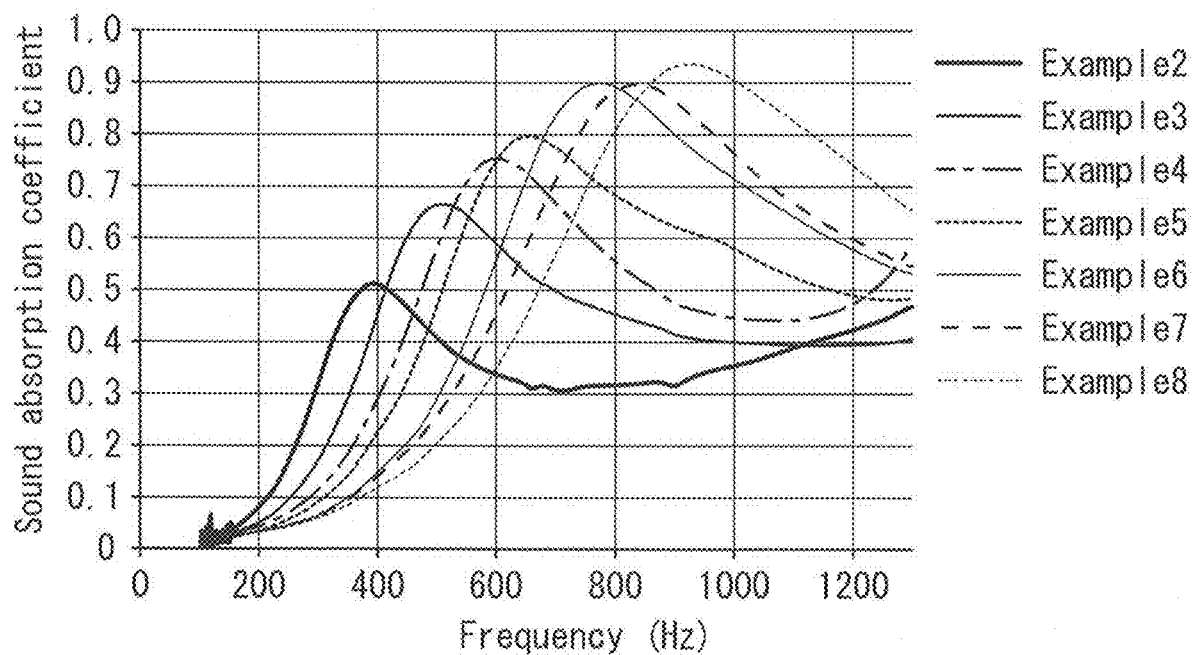
FIG. 13 is a graph showing a relationship among an opening ratio, a sound absorption coefficient and a frequency.
Figure 14:
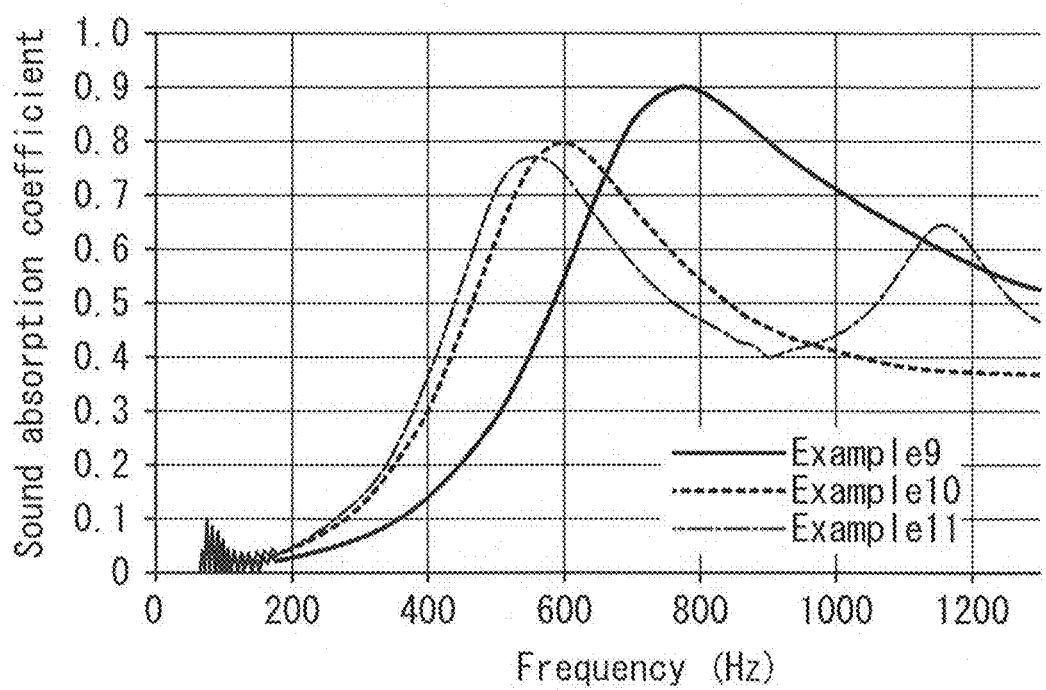
FIG. 14 is a graph showing a relationship among a length dimension of a communication part, a sound absorption coefficient and a frequency.
Figure 15:
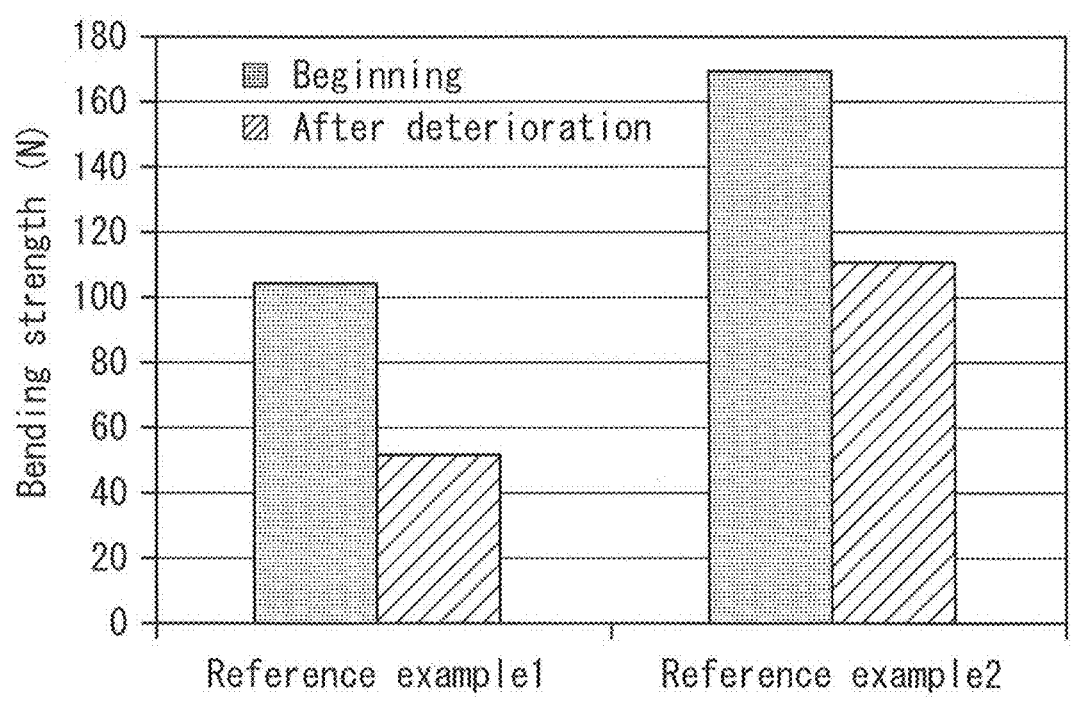
FIG. 15 is a graph showing a relationship between additives and bending strength.

Although this embodiment will be described with reference to test examples, the present disclosure is not limited to the test examples. The following Table 1 shows effects of additives. Table 2 shows the results of a test to determine whether the weight is reduced. FIGS. 12-14 are graphs showing results of the sound absorption characteristic test of each embodiment and Comparative Example 1. FIG. 15 is a graph showing a result of the evaluation test of the additives.

Example 1

The sound absorbing and insulating member of Example 1 was manufactured through a first step to a third step, examples of which were shown in FIGS. 8 to 10. A molding die shown in FIG. 7 was used to perform these steps. The raw liquid 80 in the first step includes a predetermined amount of waste paper pulp mixed into water to form a slurry. The sound absorbing and insulating member of Example 1 had a plate-like shape, as shown in FIGS. 3 to 5. A plurality of protrusions were provided at approximately equal intervals. Each protrusion was made to weigh approximately 1 g. The internal volume (volume of the first space) of each protrusion was made to be 6 $cm^3$. The average thickness dimension of the ceiling wall (general part) was set to be 0.2 cm. The length dimension (average thickness dimension of the thick part) of the communication part was set to be 0.3 cm. The opening dimension of the passage part was set to be 20 mm in diameter.

Examples 2 to 8

For the sound absorbing and insulating members of Examples 2 to 8, the number of projection portions of the molding surface was changed in order to change the total number of communication parts (passage parts) for each example. In this way, changes in the sound absorbing performance due to the opening ratio can be observed. For the sound absorbing and insulating member of Examples 2 to 9, three protrusions are provided. Each protrusion was made to weigh approximately 4 g. The inner volume (volume of the first space) of each protrusion was made to be 21.4 $cm^3$. The opening dimension of the passage part was made to be 3 mm in diameter. The other constitutions of Examples 2 to 9 were the same as that of Example 1. In Example 2, each protrusion had one communication part. In Example 3, each protrusion had two communication parts. In Example 4, each protrusion had three communication parts. In Example 5, each protrusion had four communication parts. In Example 6, each protrusion had five communication parts. In Example 7, each protrusion had six communication parts. In Example 8, each protrusion had eight communication parts.

Examples 9 to 11

For the sound absorbing and insulating member of Examples 9 to 11, each length dimension of the communication part was different from each other. The different lengths were formed because the depth dimension of the recessed portion of the molding surface was changed for each Examples. In this way, it is possible to observe changes in the sound absorbing performance due to the difference of the length dimension of the communication part. The other constitutions of the sound absorbing and insulating member of Examples 9 to 11 were the same as that of Example 6 (the example having five communication parts). In Example 9, each of the five communication parts was provided with a passage part having an opening dimension of 3 mm in diameter. In Example 9, the length dimension of each communication part was set to 2.5 mm. In Example 10, each of the five communication parts was provided with a passage part having an opening dimension of 3 mm in diameter. In Example 10, the length dimension of each communication part was set to 5 mm. In Example 11, each of the five communication parts was provided with a passage part having an opening dimension of 3 mm in diameter. In Example 11, the length dimension of each communication part was set to 7.5 mm.

Comparative Example

A surface material made of felt was used as the sound absorbing and insulating member for Comparative Example 1. The surface material had a thickness dimension of 13 mm.
[Sound Absorption Characteristic Test]
For the sound absorption characteristic test, a vertical incident sound absorption coefficient measurement device (Nihon Onkyo Engineering Co., Ltd., WinZacMTX) was used. The measurement condition was set to 315 to 5000 Hz/φ28.6 mm. The sound absorbing and insulating member of Example 1 was arranged on a measuring table in a state where its ceiling wall side was directed upward. In this state, sound was emitted from the above the sound absorbing and insulating member (corresponding to the inside of the vehicle interior), and its sound absorption coefficient was determined. The sound absorbing and insulating member of the Comparative Example 1 was placed on the measuring table, and the sound absorption coefficient was determined under the same conditions as that of Example 1. Also, the sound absorbing and insulating member of Examples 2 to 11 were placed on the measuring table in a state where their ceiling wall sides were directed upward. The sound absorption coefficient was determined under the condition of 100 to 1600 Hz/φ99.3 mm.
[Evaluation Test of Additives (Reference Examples 1 to 4)]
In order to evaluate the effects of the additives, test pieces (vertical length: 40 mm, lateral length: 25 mm, and thickness dimension: 3 mm) of Reference examples 1 to 4 were prepared. The test pieces were prepared under the same condition as that of Example 1. In Reference example 1, a raw liquid without additives was used. In Reference examples 2-4, a raw liquid including various additives was used. Specifically, the raw liquid of Reference example 2 included 3.3 wt. % of a dry paper strengthening agent, 4 wt. % of a wet paper strengthening agent, 1.0 wt. % of a sizing agent, and 0.5 wt. % of pH adjuster. The raw liquid of Reference example 3 included 3.3 wt. % of a dry paper strengthening agent, 8 wt. % of wet paper strengthening agent, 1.0 wt. % of a sizing agent, and 0.5 wt. % of a pH adjuster. The raw liquid of Reference example 4 included 3.3 wt. % of a dry paper strengthening agent, 12 wt. % of a wet paper strengthening agent, 3.3 wt. % of a sizing agent, and 0.5 wt. % of a pH adjuster. In this test, an anionic polyacrylamide resin (SEIKO PMC CORPORATION, product: DA 4104) was used as the dry paper strengthening agent, polyamide polyamine epichlorohydrin resin (SEIKO PMC CORPORATION, product: WS4020) was used as the wet paper strengthening agent, an AKD-based sizing agent comprised mainly of an alkylketene dimer (SEIKO PMC CORPORATION, product: AD1639) was used as the sizing agent, sodium hydrogen carbonate was used as the pH adjuster.

As an evaluation test of the additives, the bending strength of the test pieces of each Reference example was determined. In this test, a test machine for a three-point bending flexural test (SHIMADZU CORPORATION, product: AG-X) was used. The distance between fulcrums was set to 20 mm, and the head speed was set to 0.5 mm/min. Further, each test piece of Reference examples 1 and 2 was placed under an environment of 80 degrees C. and at 95% RH for 400 hours, so as to deteriorate them. Then, the bending strength was determined according to the above described method.
[Test to Determine Whether the Weight is Reduced (Reference Examples 5 and 6)]

Figure 16:
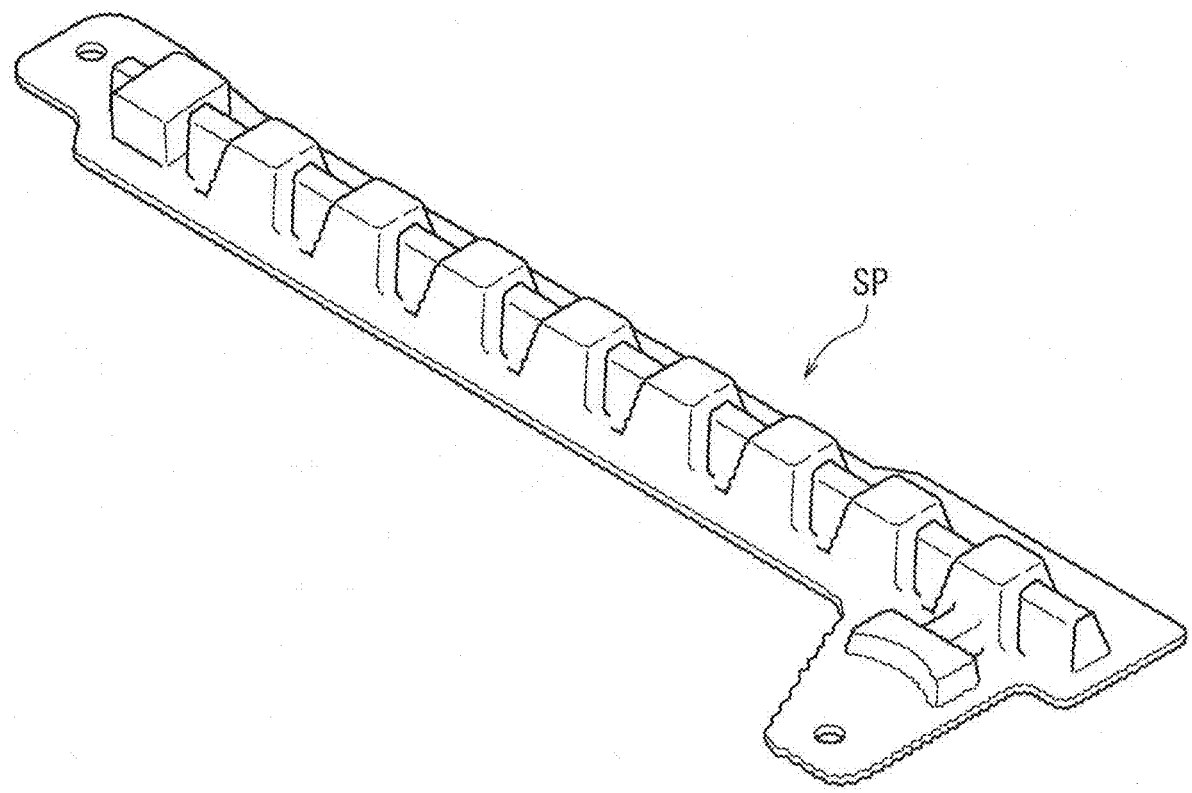
FIG. 16 is a perspective view of a test sample used for a test to determine whether the weight is reduced.

We prepared test samples, having the shape as shown in FIG. 16, made of a different materials in order to determine whether weight could be reduced. The shape of the test sample is a plate-like member used as a protector for a wire harness. The test samples have a generally rectangular shape, as seen from the upper side. The test sample is provided with hollow protrusions, which are arranged in parallel along their longitudinal directions. The test sample of Reference example 5 is a plate-like member made of polypropylene (PP). The test sample of Reference example 6 is made of a material in which the cellulosic fibers are integrated in a laminated state, which was the same material as Example 1. The test sample of Reference example 6 is formed so as to have substantially the same rigidity (bending strength) as the test sample of Reference example 5. The rigidity was set by adjusting its thickness dimension or the like. A weight reduction rate of the test sample of Reference example 6 was calculated by following Equation 2. A specific gravity reduction rate of the test sample of Reference example 6 was calculated by following Equation 3.

(Weight reduction rate)=((Weight of the test sample of Reference example 5)−(Weight of the test sample of Reference example 6))/(Weight of the test sample of Reference example 5)×100    Equation 2:

(Specific gravity reduction rate)=((Specific gravity of the test sample of Reference example 5)−(Specific gravity of the test sample of Reference example 6))/(Specific gravity of the test sample of Reference example 5)×100    Equation 3:

TABLE 1

|  | Reference example 1 | Reference example 2 | Reference example 3 | Reference example 4 |
|---|---|---|---|---|
| Dry paper strengthening agent (wt. %) | — | 3.30 | 3.30 | 3.30 |
| Wet paper strengthening agent (wt. %) | — | 4 | 8 | 12 |
| Sizing agent (wt. %) | — | 1.00 | 1.00 | 3.30 |
| PH adjuster (wt. %) | — | 0.50 | 0.50 | 0.50 |
| Average bending strength (N) | 104.8 | 169.7 | 177.4 | 189 |
| Average bending strength (N) after deterioration | 52 | 111.7 | — | — |

TABLE 2

| Material | Weight | Weight Reduction Rate | Specific gravity | Specific gravity reduction rate |
|---|---|---|---|---|
| Reference example 5 | Polypropylene | 98 g | — | 0.9 | — |
| Reference example 6 | Cellulosic fiber | 64 g | 35% | 0.41 | 54% |

[Test Results and Discussion]

With reference to FIG. 12, we found that the sound absorbing and insulating member of the Comparative Example 1 was not suitable for efficiently absorbing sound at a specific frequency, because its sound absorption coefficient curve was generally broad. Unlike this, the sound absorbing and insulating member of Example 1 has a relatively high sound absorption coefficient, in comparison with the Comparative Example 1. Further, the sound absorption coefficient curve of Example 1 has a sharp peak near 1,000 Hz. We think that this result is due to the communication part (passage part) having an appropriate configuration formed by using the thick part of the protrusion. Thus, we believe we could appropriately improve the performance of a sound absorbing and insulating member made of cellulosic fibers in this embodiment.

With reference to FIG. 13, sound absorption coefficient curves having a sharp peak were obtained from the sound absorbing and insulating member of Examples 2 to 8. As a result of each embodiment, we found that the peak of the sound absorption coefficient curve can be shifted toward a high frequency region by increasing the number of the communication parts so as to increase the opening ratio. Consequently, it is easily estimated that the peak of the sound absorption frequency can be made wider so as to absorb a wide range frequency of sound by using a combination of protrusions having a different number of the communication parts (opening ratios). In this embodiment, it has also been found that the above-described effect can be obtained by simply changing the number of the projection portions of the molding die.

With reference to FIG. 14, the sound absorption coefficient curves having a sharp peak were obtained from the sound absorbing and insulating member of Examples 9 to 11. From the result of each embodiment, we found that the peak of the sound absorption coefficient curve can be shifted toward a low frequency region by increasing the length dimension of the communication part. As a result of the above, it is easily estimated that the peak of the sound absorption frequency can be made wider so as to absorb a wide frequency range of sounds by using a combination of protrusions having different length dimensions of the communication parts. In this embodiment, it has been found that the above-described effect can be obtained by simply changing the depth dimension of the recessed portion of the molding die.

Referring to Table 1 and FIG. 15, comparing the test piece of Reference example 1 with the test pieces of Reference examples 2-4, we found that the average bending strength was improved by adding one or more additive. Comparing the test pieces of Reference examples 1 and 2, we found that the average bending strength was improved both before deterioration and after deterioration by adding one or more additive. Further, by adding a sizing agent to the test pieces of Reference examples 2 to 4, it is easily estimated that the water resistance of the test pieces of Reference examples 2 to 4 can be improved, compared to the Reference example 1. Thus, we found that various kinds of additives can be added to improve various performance metrics of the sound absorbing and insulating member. Referring to Table 2, the weight and the specific gravity of the test sample of Reference example 6 was significantly reduced, compared with the test sample of Reference example 5. Thus, we found that a sound absorbing and insulating member can be made of the cellulosic fibers so as to have the same rigidity as that of a resin sound absorbing and insulating member, while also contributing to weight reduction.

The sound absorbing and insulating member of this embodiment is not limited to the above-described embodiment, and other various embodiments may be available. In this embodiment, the above constitution (shape, size, arrangement, arrangement number, etc.) of the sound absorbing and insulating member 13 was exemplified. However, this is not intended to limit the constitution of the sound absorbing and insulating member. For example, a sound absorbing and insulating member as a component of a vehicle may be installed on a floor, a ceiling, and/or a side wall of a vehicle interior, or installed at/in a part of an instrument panel, a pillar garnish, a console, a door trim and/or another component of the vehicle. The sound absorbing and insulating member may also be installed in a section or the like for partitioning the vehicle interior and another vehicle interior structures (such as a trunk space, an engine compartment, etc.). Each partition member may constitute a part of the other components of the vehicle, or may be a member different from the other components. The shape and/or size of the sound absorbing and insulating member and each partition member can be appropriately set depending on use applications (soundproof, reinforcement, raising, etc.) and/or required sound absorbing performance and sound insulating performance.

Although a specific configuration (shape, size, arrangement, number, etc.) of the protrusion 15, the communication part 30, etc. were exemplified in the present embodiment, this is not intended to limit the configuration of these components. For example, the protrusion may have various three-dimensional shapes, such as a rectangular column shape (pillar shape) including a quadrangular pyramid shape, a rectangular parallelepiped shape, a cubic shape, and a cylindrical shape, a conical shape, a hollow cylindrical shape, and a hemispherical shape. The plurality of protrusions may have an individual shape and/or dimension. The sound absorbing and insulating member may be deformed by being bent and/or curved, according to the shape of each protrusion. The sound absorbing and insulating member may have at least one inclined side wall so that its cross section forms a hat cross section. In this embodiment, only the rear side wall may be linearly inclined. The side walls may be linearly inclined or bent and inclined like a staircase or the like. The side walls may be curved so as to form curved surfaces. The number of communication parts formed in each wall of the protrusion may be plural or singular. For example, in this embodiment, the communication part may be appropriately formed in the ceiling wall, the front side wall, the rear side wall, the right side wall, and/or the left side wall. The thick part forming the outer shape of the communication part can be formed as a part of the upper surface of the protrusion. The thick part may be formed so as to extend transversely or longitudinally to the upper surface of the protrusion. In the sound absorbing and insulating structure, one or more first spaces can be provided. When a plurality of the first spaces are provided, these volumes can be independently set. The communication part may only have the passage part, and a groove part may be formed as required. The second space may be provided as required. When a plurality of the second spaces are provided, a partition wall for partitioning adjacent second spaces can be provided in the sound absorption and sound insulation member. The second spaces can be partitioned by using a rib or the like provided on the partition member.

Although the method for manufacturing the sound absorbing and insulating member is exemplified in this embodiment, it is not intended to limit the manufacturing method. For example, the recessed portion can be provided at an appropriate position of the molding surface according to a position and/or a shape of the thick part (communication part). A space in the recessed portion may be various shapes, such as a cylindrical shape, a columnar shape or a space shape forming a plate shape. The projection portion may have various shapes, such as a rod shape including a pin shape or the like, or a plate shape, according to the shape of the passage part. A plurality of projection portions can be provided at the recessed portion, and need not necessarily project from the opening of the recessed portion. The projection portions may be detachably attached to the recessed portion. A plurality of kinds of projection portions may be suitably selected and provided. When the groove part is not provided in the protrusion or when the groove is post-attached to the protrusion (when the groove part is formed after the protrusion is formed), the recessed portion for the groove may be omitted from the molding surface.

The invention claimed is:

1. A manufacturing method of a sound absorbing and insulating member, wherein:
   the sound absorbing and insulating member has a hollow protrusion and a communication part communicating an inside of the protrusion with and an outside of the protrusion;
   a molding die for molding the sound absorbing and insulating member includes a molding surface having an outer shape corresponding to the protrusion, a net material arranged along the molding surface, and a liquid suction part opened in the molding surface; and
   the molding surface has a recessed portion provided at a position where the communication part is formed, and a rod-like or plate-like projection portion projecting from a bottom of the recessed portion and passing through the net material,
   the manufacturing method comprising:
   a first step of immersing the molding die in a raw liquid including cellulosic fibers, and sucking liquid of the raw liquid through the net material by the liquid suction part so as to cause the cellulosic fibers to be laminated on the net material,
   a second step of drying the cellulosic fibers laminated on the net material so as to form the protrusion, and drying the cellulosic fibers laminated on the recessed portion so as to form an outer shape of the communication part, and
   a third step of removing the dried protrusion and the communication part from the molding die so as to communicate the inside of the protrusion with and the outside of the protrusion through a passage part of the communication part formed at a position where the projection portion was arranged.

2. The manufacturing method of the sound absorbing and insulating member according to claim 1, wherein an opening ratio of the passage part is defined by at least either an external dimension of the projection portion or the number of the projection portion.

3. The manufacturing method of the sound absorbing and insulating member according to claim 1, wherein a length dimension of the communication part is defined by a depth dimension of the recessed portion.

4. The manufacturing method of the sound absorbing and insulating member according to claim 1, wherein the protrusion and the communication part are integrally formed during the second step.

5. The manufacturing method of the sound absorbing and insulating member according to claim 1, wherein the projection portion projects beyond an opening of the recessed portion.

6. The manufacturing method of the sound absorbing and insulating member according to claim 1, wherein the raw liquid includes at least either an additive for improving water resistance of the sound absorbing and insulating member or an additive for improving strength of the sound absorbing and insulating member.

7. An apparatus for manufacturing a sound absorbing and insulating member, comprising:
   a molding die for molding the sound absorbing and insulating member, wherein
   the molding die includes:
   a molding surface,
   a net material arranged along the molding surface,
   a liquid suction part opened in the molding surface,
   a recessed portion provided in the molding surface, and
   a projection portion projecting from a bottom of the recessed portion and passing through the net material,
   the molding die is configured to be immersed in a raw liquid including cellulosic fibers,
   the liquid suction part is configured to suck liquid of the raw liquid through the net material so as to cause the cellulosic fibers to be laminated on the net material,
   the net material is configured to hold the cellulosic fibers laminated thereon while they dry,
   the recessed portion is configured to hold the cellulosic fibers laminated thereon while they dry, and
   the projection portion is configured to project through the cellulosic fibers laminated on the recessed portion while they dry.

8. The apparatus for manufacturing the sound absorbing and insulating member according to claim 7, wherein an additional one or more projection portion(s) is/are positioned within the recessed portion.

9. The apparatus for manufacturing the sound absorbing and insulating member according to claim 7, wherein the projection portion projects beyond an opening of the recessed portion.

10. The apparatus for manufacturing the sound absorbing and insulating member according to claim 7, wherein the raw liquid includes an additive selected from the group consisting of an additive for improving water resistance of the sound absorbing and insulating member and an additive for improving strength of the sound absorbing and insulating member.

11. The apparatus for manufacturing the sound absorbing and insulating member according to claim 7, wherein the projection portion is longer than the recessed portion as measured in a depth direction of the recessed portion.

* * * * *